(12) United States Patent
Patel et al.

(10) Patent No.: US 7,127,179 B2
(45) Date of Patent: *Oct. 24, 2006

(54) POLARIZATION ENCODER DEVICE

(75) Inventors: Jayantilal S. Patel, Newtown, PA (US); Zhizhong Zhuang, Yardley, PA (US)

(73) Assignee: Optellios, Inc., Ewing, NJ (US)

( * ) Notice: Subject to any disclaimer, the term of this patent is extended or adjusted under 35 U.S.C. 154(b) by 556 days.

This patent is subject to a terminal disclaimer.

(21) Appl. No.: 10/013,262

(22) Filed: Dec. 10, 2001

(65) Prior Publication Data

US 2002/0089723 A1    Jul. 11, 2002

Related U.S. Application Data

(63) Continuation-in-part of application No. 09/974,826, filed on Oct. 12, 2001, now Pat. No. 6,535,335.

(60) Provisional application No. 60/257,792, filed on Dec. 22, 2000, provisional application No. 60/254,692, filed on Dec. 11, 2000, provisional application No. 60/252,557, filed on Nov. 22, 2000.

(51) Int. Cl.
*H04B 10/00* (2006.01)

(52) U.S. Cl. .......................... 398/152; 398/45; 398/65; 398/79; 359/497; 359/495; 356/454; 356/491; 356/519

(58) Field of Classification Search ................ 398/45, 398/65, 79, 152; 359/495, 497; 356/454, 356/491, 519
See application file for complete search history.

(56) References Cited

U.S. PATENT DOCUMENTS

| | | | |
|---|---|---|---|
| 4,103,260 A * | 7/1978 | Buchman | 359/250 |
| 5,068,749 A * | 11/1991 | Patel | 349/198 |
| 5,414,541 A | 5/1995 | Patel et al. | 349/196 |
| 5,694,233 A | 12/1997 | Wu et al. | 398/49 |
| 5,724,165 A * | 3/1998 | Wu | 398/55 |
| 5,867,291 A * | 2/1999 | Wu et al. | 398/49 |
| 5,912,748 A * | 6/1999 | Wu et al. | 398/49 |
| 5,946,116 A | 8/1999 | Wu et al. | 398/55 |
| 5,978,116 A | 11/1999 | Wu et al. | 398/49 |
| 5,978,125 A | 11/1999 | Yao | 359/756 |
| 6,097,518 A * | 8/2000 | Wu et al. | 398/1 |
| 6,134,031 A * | 10/2000 | Nishi et al. | 359/15 |
| 6,163,393 A | 12/2000 | Wu et al. | 398/1 |
| 6,212,313 B1 | 4/2001 | Li | 385/24 |

(Continued)

OTHER PUBLICATIONS

S. E. Harris, E. O. Ammann and I.C. Chang, "Optical Network Synthesis using Birefringent Crystals. I. Synthesis of Lossless Networks of Equal-Length Crystals,"Journal of the Optical Society of America (vol. 54, No. 10, pp. 1267-1279, Oct. 1964).

(Continued)

*Primary Examiner*—Hanh Phan
(74) *Attorney, Agent, or Firm*—Duane Morris LLP.

(57) ABSTRACT

A optical polarization encoding device (16) provides wavelength dependent processing of polychromatic optical signals without prior separation into narrow wavelength bands. Embodiments of the encoding device include a wavelength dependent tunable optical switch (400, 500) and a wavelength tunable optical level controller (600). An encoded signal is processed, (e.g., rerouted or attenuated), as a function of wavelength using polarization dependent devices (18). Desired states of polarization are imparted to optical signals to either direct selected wavelengths to selected output ports (optical switch), or to adjust the level of selected channels or wavelengths (level controller). Desired polarizations are achieved simultaneously at all wavelengths contained within the incoming signal by independently varying the birefringence and/or crystallographic orientation of each variable element within the stack.

44 Claims, 23 Drawing Sheets

U.S. PATENT DOCUMENTS

| | | | |
|---|---|---|---|
| 6,215,923 B1 | 4/2001 | Li | 385/24 |
| 6,243,200 B1 | 6/2001 | Zhou et al. | 359/497 |
| 6,333,816 B1 | 12/2001 | Chen et al. | 359/497 |
| 6,441,960 B1 * | 8/2002 | Wang et al. | 359/497 |
| 6,535,335 B1 * | 3/2003 | Patel et al. | 359/497 |
| 6,600,582 B1 * | 7/2003 | Liu et al. | 398/79 |
| 6,611,342 B1 * | 8/2003 | Patel et al. | 356/519 |
| 6,778,715 B1 * | 8/2004 | Ramachandran | 385/5 |
| 2004/0202480 A1 * | 10/2004 | Weid et al. | 398/147 |

OTHER PUBLICATIONS

E. O. Ammann and I. C. Chang, "Optical Network Synthesis using Birefringent Crystals. II. Synthesis of Networks Containing One Crystal, Optical Compensator, and Polarizer per Stage," Journal of the Optical Society of America (vol. 55, No. 7, pp. 835-841, Jul. 1965).

* cited by examiner

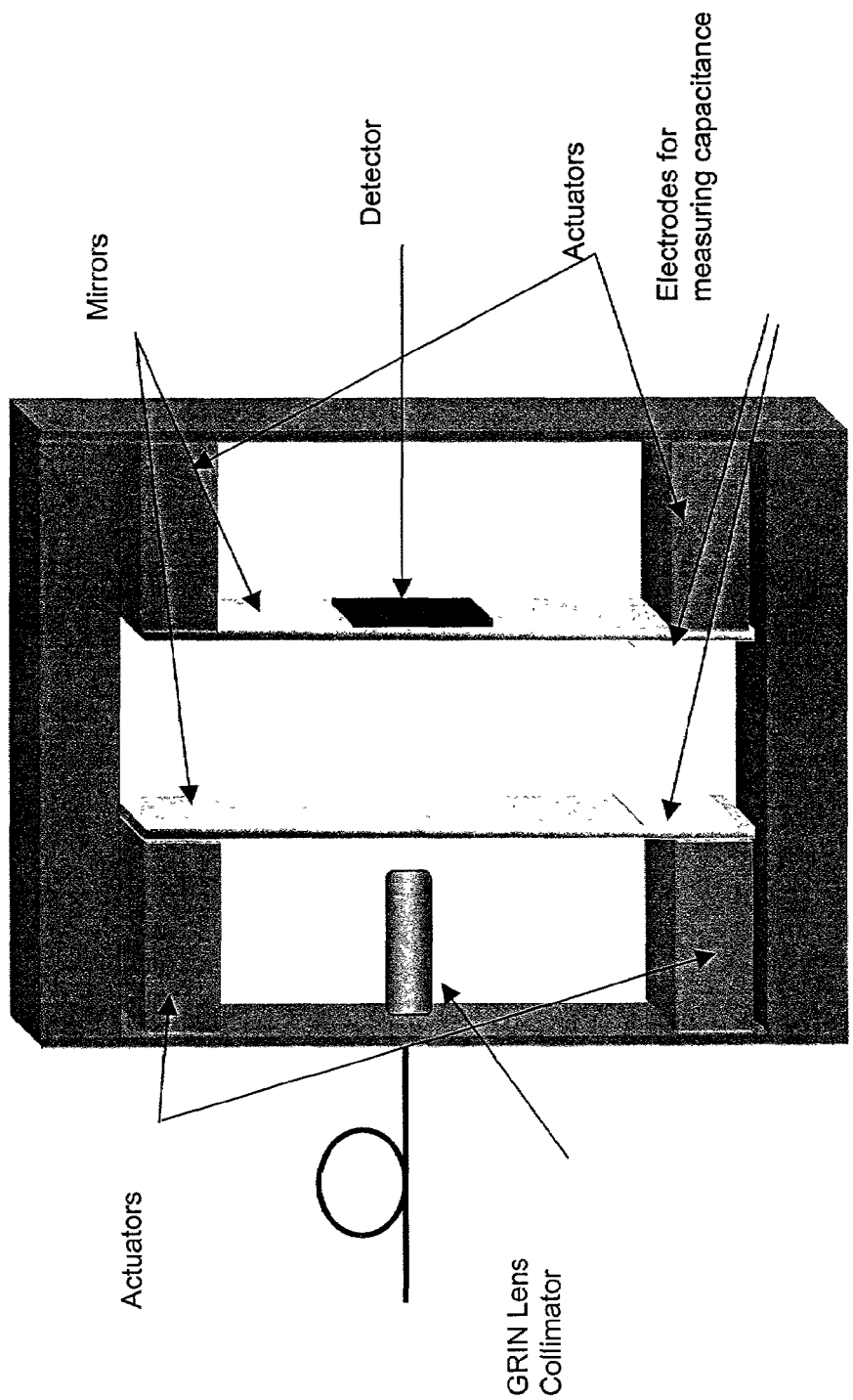

POLARIZATION ENCODER DEVICE

CROSS REFERENCE TO RELATED APPLICATIONS

This is a continuation in part of U.S. patent application Ser. No. 09/974,826, filed Oct. 12, 2001 now U.S. Pat. No. 6,535,335, which claims the priority of U.S. Provisional Application Ser. No. 60/252,557, filed Nov. 22, 2000. This application also claims the priority of U.S. Provisional Applications Ser. No. 60/254,692, filed Dec. 11, 2000, and Ser. No.60/257,792, filed Dec. 22, 2000, which are hereby incorporated in their entirety.

FIELD OF THE INVENTION

The invention relates to devices and methods used in optical transmission systems, and more specifically provides a polarization encoder and method for altering the polarization characteristics of optical signals as a function of wavelength.

BACKGROUND

In connection with wavelength division multiplexed (WDM) optical communication systems and other uses, there is a need for inexpensive, efficient means to effect wavelength dependent processing of optical signals. Examples of wavelength-dependent processing include, for example, wavelength selective optical switching, e.g., for routing individual wavelength channels in WDM systems, and wavelength-specific power attenuation, which can be useful for gain equalization in a WDM system.

A typical approach to wavelength dependent processing of optical signals involves first separating, or demultiplexing, individual wavelength bands as independent channels, and then processing the information from each channel separately. The processed channel information may be multiplexed back into a single transmission path, such as a single optical fiber, or separately distributed, or manipulated in various other ways.

A disadvantage of conventional demultiplexer- and multiplexer-based devices is that insertion losses are generally high, often as high as 4 –5 dB per stage. Another disadvantage is that devices relying on conventional demultiplexer geometry tend to be bulky. The systems also can be expensive.

Various switching techniques likewise have been implemented, each having its particular disadvantages. In one technique, for example, an optical signal is converted to the electrical domain to perform switching operations and then converted back to the optical domain for continued transmission or processing. This technique is expensive and is data format dependent.

There is a need for methods and apparatus capable of wavelength dependent processing of optical signals, wherein disadvantages associated with conventional multiplexer and demultiplexers, including losses, undue expense, bulky geometries, cross talk and similar problems, are substantially alleviated.

As applied according to the present invention, one way to facilitate selective processing of light, comprises imparting distinct polarization properties to one or more portions of the light that is to be processed differently from other portions (e.g., routed, attenuated, etc.). This can involve alteration of the polarization properties of an optical input signal as a function of wavelength, to selectively mark one or more wavelengths for particular processing. The polarization properties of an optical signal in that case can provide a parameter that permits components present in the optical signal to be discriminated or treated differently. For example, differently polarized signals can be routed along different signal paths by a polarization beam splitter, where they might be further processed in different ways.

Such polarization encoding can be useful in 7 various ways, for example to correct for distortion by adjusting power levels as a function of wavelength, to switch wavelength bands on and off or to route different wavelengths along different signal paths, etc. However, it is not readily apparent how wavelength specific polarization should be imparted in an efficient manner. The process would seem to require first separating the input signal into individual wavelength bands that are coupled to distinct transmission paths (i.e., demultiplexing), subjecting the separated individual wavelength bands to different processes, for example with some being subjected to a particular polarization alteration while others are not, and then recombining or multiplexing the differently-processed wavelengths. It is still less apparent how such wavelength band specific polarization could or should be imparted arbitrarily and changeably, whereby specific bands could be chosen for attenuation or switching, etc., on the fly.

One can understand some of the difficulties by considering a situation in which a signal containing a plurality of distinct wavelength bands passes through an optical device such as a waveplate. Assuming that all the light that enters the device also emerges, it would seem that some additional mechanism is needed for any wavelength-selective effects. This is particularly true if the effects are to be controllable, or if any substantial channel separation is desired, because all the portions of the input light that pass through are presumably equally or nearly-equally affected by the device. The wavelength dependent phase retardation might provide a basis for obtaining different effects as a function of wavelength, but any difference is likely to be minimal for closely adjacent wavelengths. Single waveplates would seem to have limited application. A series of stacked elements such as birefringent elements might affect particular wavelength bands differently from others, but this still does not seem a good candidate for use to arbitrarily manipulate selected wavelength channels or groups of channels. See, for example, Harris, Amman and Chang, "Optical Network Synthesis using Birefringent Crystals. I. Synthesis of Lossless Networks of Equal-Length Crystals," and Amman and Chang, "Optical Network Synthesis using Birefringent Crystals. II. Synthesis of Networks Containing One Crystal, Optical Compensator, and Polarizer per Stage."

A fixed stack of birefringent elements has been used in conjunction with a digital polarization converter to allow some control over the transfer function of an optical device. In particular, stacked birefringent elements have been tried as a solution to all-optical switching based on polarization as shown, for example, in U.S. Pat. No. 5,694,233 to Wu, et al. ("the '233 patent").

There remains a need for a practical and workable device that can selectively and controllably change a polarization state of arbitrarily selected channels out of a plurality of channels, thereby allowing various further processing of an optical signal, among other useful results.

SUMMARY OF THE INVENTION

A polarization encoder provides wavelength dependent processing of polychromatic optical signals in a manner that does not require preliminary separation of the signals into wavelength bands and routing on separate paths, in order to subject selected wavelength bands to different processing steps.

One embodiment of the encoder includes at least one optical component configured and arranged to receive at least one input beam of light having a plurality of wavelengths that can be treated as distinct channels. The encoder selectably and controllably imparts a particular polarization state to selected ones of the channels, thus marking the channels in a manner the permits later discrimination.

According to an inventive aspect, the allotment of wavelengths to particular polarization states can be controllably variable. This permits various forms of control. The channels can be routed along distinct paths by using polarization responsive diversion elements, namely switching of channels by their polarization states. The power of the channels can be proportioned between two or more destinations in a similar polarization sensitive manner, by setting polarization states that correspond in part to one of two orthogonal polarization states that are applied to a diversion element. This technique also permits the power applied to a given destination path to be selectively and controllably attenuated, and these forms of control can be applied selectively to the channels in accordance with their chosen imparted polarization states.

Thus according to the various embodiments, the invention can comprise a selective channel polarization encoder capable of selectively imparting any of a number of different polarization states. In another embodiment, such a polarization encoder is configured to select between at least two states and arranged for switching at least one optical component selectively. In a further embodiment the switching is proportionate and in still another embodiment proportionate routing is applied as a form of controllable attenuation.

A number of additional applications and variations are also possible, consistent with the following discussion of the invention and its illustration using some particular examples.

BRIEF DESCRIPTION OF THE DRAWINGS

This description is best understood when read in connection with the accompanying drawing. The various features of the drawings may be illustrated schematically and/or may not be to scale. Included in the drawings are:

FIG. 23 is a diagram of a tunable Fabry-Perot interferometer for measuring output power level in accordance with the present invention.

DETAILED DESCRIPTION

A polarization encoder as described herein comprises a device that can alter the polarization state of an optical signal, and in particular that can alter polarization of the optical signal differently, selectably and changeably as a function of wavelength, preferably according to an arbitrary transfer function in which different wavelengths can be grouped in one or several distinct polarization states. Such a device can be used advantageously in applications such as distortion correction, optical power level adjustment, tunable optical switches and the like, and can function without the need for preliminary demultiplexing steps for separating channels before processing them. Nevertheless, the device provides a way in which selected wavelengths can be marked and later distinguished from one another.

Figure 1:
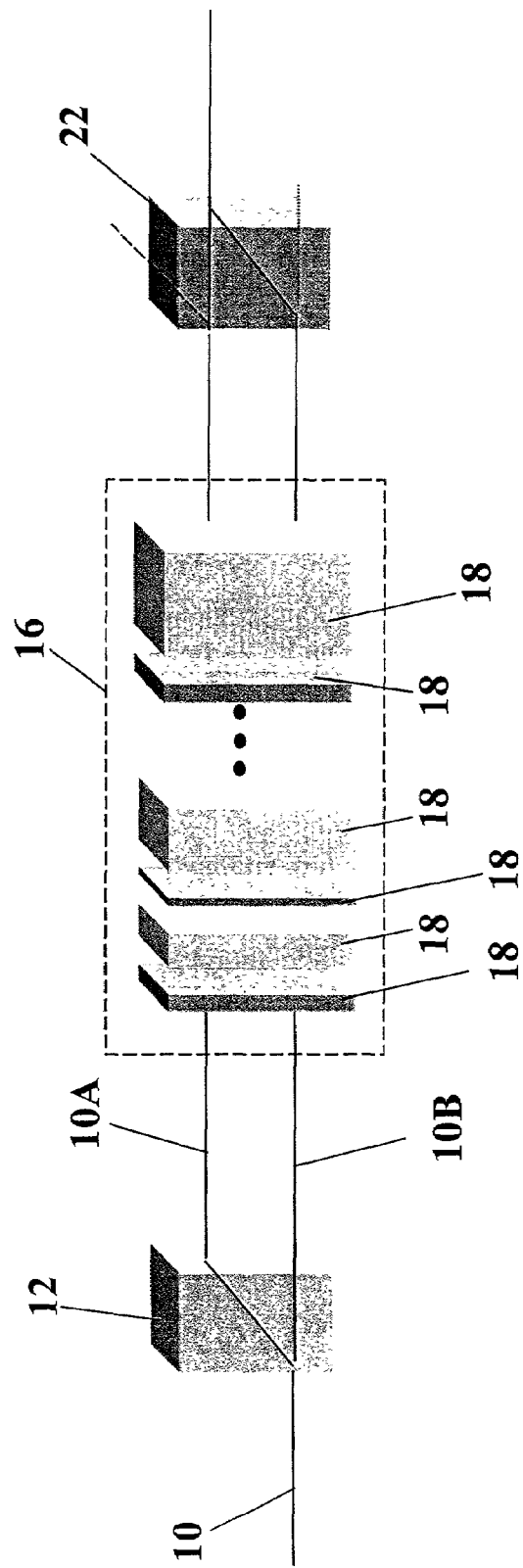
FIG. 1 is a schematic diagram of representation of an embodiment of an optical polarization encoder in accordance with the present invention.

According to an inventive aspect, the invention is accomplished using a unique polarization encoder, shown schematically in FIG. 1. An incoming or input polychromatic optical signal 10 can be assumed to have an arbitrary polarization, and comprises a plurality of wavelength bands or channels. The input signal 10 is passed through a polarization splitter 12, producing two intermediate beams 10A, 10B that each have one of two known linear mutually orthogonal polarization states. Subsequent polarization dependent processing of both beams before the two beams are again combined, produces Stokes parameters of equal magnitude and opposite sign for each particular wavelength component contributed by each beam.

A result of this preliminary division of an arbitrarily polarized beam into two orthogonal polarization components, is that the full power level of the input signal is preserved, and together, the two orthogonal beams cause the overall polarization encoder to be insensitive to the polarization state of the input. The polarization splitter 12 may be, for example, a polarization beam splitter, a beam displacer, a Wollaston prism, or another component operable to separate an input beam into a pair of intermediate beams with orthogonal polarization states.

It should be appreciated that it would be possible to commence processing of an input beam without splitting it preliminarily into orthogonal components. For example, the input beam may already have a known and/or normalized polarization state from which alterations according can progress according to the invention.

The intermediate beams 10A and 10B are passed through a polarization encoding component 16, that comprises a plurality of birefringent plate elements 18 arranged optically in series along a transmission path of the light beam. Birefringent materials are known to alter the polarization state of a beam traversing the birefringent material. This occurs because the phase delay due to the birefringent material is different with respect to polarization components of the incident light beam. In this way, the polarization state is changed because one of these components experiences a phase delay in traversing the birefringent material, that is unequal to the phase delay experienced by the component orthogonal thereto.

Throughout the specification, the grouped series 16 of arranged elements 18 along the transmission path may be referred to as a "stack" of elements. It should be appreciated, however, that the serially placed elements can be affixed or abutted together or can be adjacent elements that are separated by other optical elements or by air gaps, for example. The elements need not be placed in a straight line, provided that if they are not in line then means (not shown) are included at any diversion to direct the light along a path intersecting the next successive elements.

Each of the birefringent elements 18 may have a fixed or variable value of birefringence. Additionally, the elements may be rotatable about an optical axis, which changes the orientation of the fast and slow birefringent axes relative to a fixed orientation.

The several elements may be substantially identical, or may be different by having differing thicknesses or being made from different materials. As previously mentioned, the elements can have controllably variable birefringence or can have fixed birefringence. Some examples of materials which may be used in birefringent elements include nematic liquid crystals, liquid crystals which utilize ferroelectric, other electroclinic, flexoelectric, thermal or other similar effects, optically clear PLZT (lead lanthanum zirconate titanate), appropriately cut calcite crystals, liquid crystals, and birefringent fibers such as polarization maintaining fibers.

Stack elements 18 may be arranged in any order. The crystallographic orientation of each element may be rotated independently and fixed at an arbitrary angle with respect to the fast or slow axis of the birefringent material within the element. In general, the polarization state for any and all wavelengths passing through the stack can be controllably altered. While the transfer function for each wavelength is generally coupled to transfer functions for other wavelengths, appropriate adjustments to the overall transfer function can be used to allow control over the polarization of any individual wavelength range. So while control over a given channel may not be strictly independent of control over the other channels, each channel may still be individually controlled.

A polarization encoder as described herein provides for selection of arbitrary polarization characteristics, in contrast to the simple binary switching mechanisms shown in the prior art. That is, more than two distinct states are available to be chosen as the state for a given wavelength. Moreover, the device may be continuously tuned rather than only discretely tuned, permitting an allocation of available power between polarization states. Typically, the polarization state imparted to a given wavelength or component is used eventually to discriminate for that component, either alone or together with other wavelength components that have been imparted the same polarization state. A polarization encoder as described herein provides for selection of arbitrary wavelength dependent polarization characteristics, in contrast to the fixed wavelength dependent switching mechanisms shown in the prior art. That is, the wavelength characteristic, such as channel bandwidth, can be controllably variable.

Design of an appropriate configuration is achievable using an optimization process in which the birefringence and/or fast/slow axis orientation of each stack element may be varied independently until a desired polarization state is attained for all wavelengths across a given band of interest. There are several different geometries, which can be used to achieve wavelength encoding. One approach is to hold the relative orientation of all the elements fixed and selectively tune the birefringence value of the variable stack elements. It is also possible to fix the birefringence values of all the elements and change the relative orientation with respect to each other.

It has been found that with a number of stacked elements 18 with controllable birefringence and optionally also orientation, a complex transfer function can be arranged in which there is a crisp division between polarization states as a function of wavelength. Furthermore, because the refractive index can be changed by electrical, mechanical, magnetic, optical and/or thermal control (e.g., perturbation) of the birefringence of the stacked elements, the phase retardation, and hence the transfer function can also be changed using any of the aforementioned external controls.

For most applications, sufficient flexibility is achieved if some of the fixed elements are held in a fixed orientation and retardation, and the optical retardation of certain interlaced variable elements are allowed to change with respect to the magnitude of the retardation using an external stimuli. Such devices for example the variable elements, can be made by using electro-optic elements in which the optical axis of a birefringent element are fixed but the magnitude of the retardation is altered with an externally applied field. The variable elements in this case, for example, can be made using liquid crystal devices.

For many applications, sufficient flexibility is also achieved if all of the fixed elements are held in a fixed orientation, and the optical orientation of the variable elements, fixed at some birefringence value such as half wave, are allowed to be arbitrarily rotated. Such devices for example, can be made by using electro-optic elements in which the optical axis of a birefringent element can be rotated with an externally applied field. The variable elements in this case, for example, can be made using the electroclinic effect in liquid crystals. It is also possible to use twisted nematic liquid crystal devices as the variable elements, which in essence change both the effective birefringence and at the same time effectively rotate the plane of polarization. A greater degree of flexibility is achieved by allowing complete freedom of both the birefringence value and the orientation of the element, at the cost of making the device more complex.

Referring again to FIG. 1, after traversing a plurality of elements the two intermediate beams 10A and 10B are further processed by optical device 22. Optical device 22 may be a polarization combiner, such as may be used with an optical power level controller as described in detail herein, or a polarization beam splitter, such as may be used with a tunable optical switch, as also described in detail herein. The polarization splitter 22 may be a polarization beam splitter, a beam displacer, a Wollaston prism, or another similar device. Optical device 22 may also simply be an optical coupler, which can induce the polarization dependent interference effect when different light paths are combined together.

A polarization dependent component portion of each incoming beam may be diverted from the initial optical path on passage through a second polarization splitter at device 22. By controlling the polarization at each wavelength with the polarization encoder 16, one can control the proportion of each beam that is diverted. If only a portion of a partly-diverted beam is collected along a given path, the device effectively functions as a wavelength dependent optical attenuator for that path. It will be appreciated that by providing controllable polarization attributes as a function of wavelength, the device can switchably route wavelengths along selectable paths, or can proportion power levels wholly (as a switch) or partly (as an attenuator or proportioning control. One embodiment of the polarization splitter is a calcite beam displacer, which can provide compact device geometry.

Figure 2:
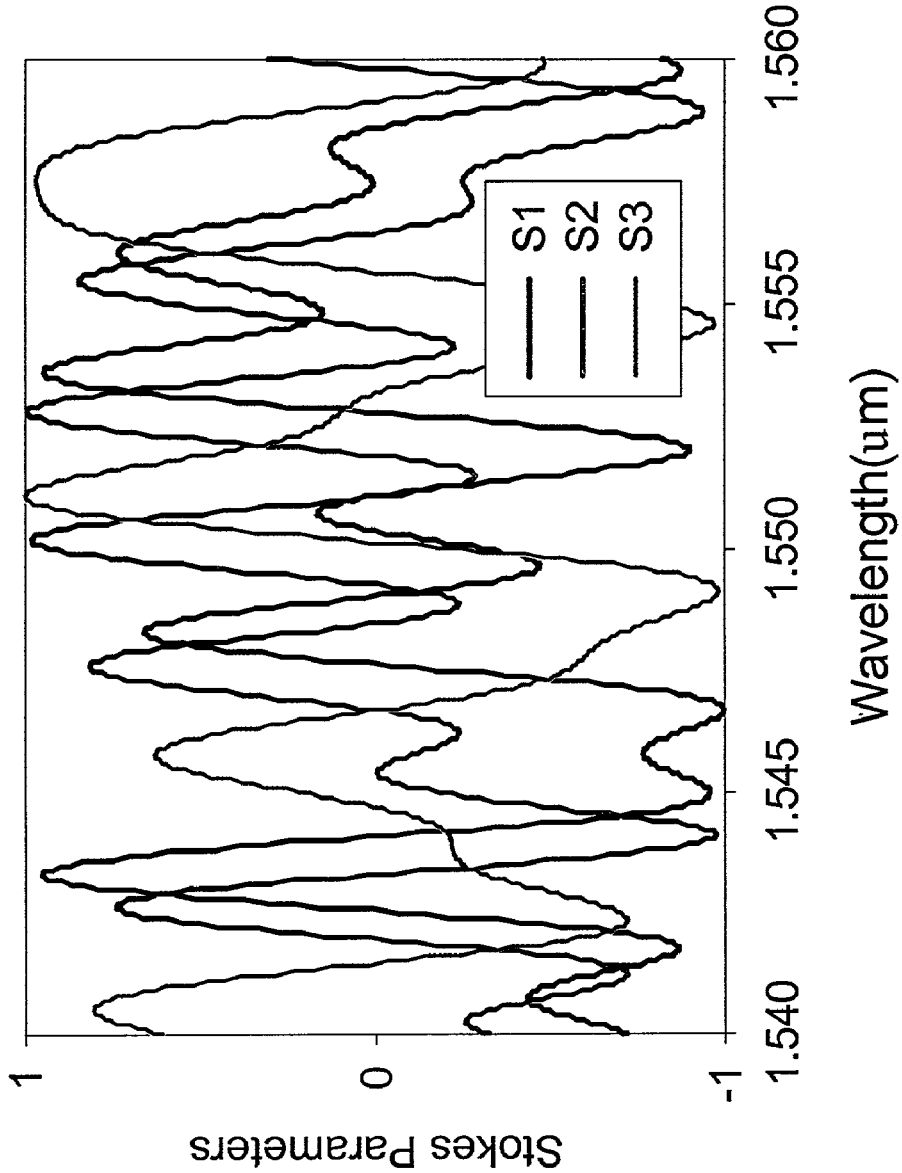
FIG. 2 is a graph depicting Stokes parameters versus wavelength generated with a computer simulation for an exemplary stack configuration according to the invention.

Results of a computer simulation for one possible stack configuration are shown in FIG. 2, with Stokes parameters represented by three traces graphed as a function of wavelength. The simulated stack used for the depicted simulation consisted of 11 elements, with five being fixed. The birefringence value was chosen to be the same for all elements at 0.2. Fixed and variable elements were alternated one for one (fixed-variable-fixed-variable . . . ) with all fixed elements oriented parallel to each other.

Each of the variable elements was oriented with that element's optical axis at 45 degrees with respect to the orientation of the fixed elements. The thicknesses in microns of the 11 layers were as follows: 8.75, 250, 11.84, 450, 4.78, 810, 7.09, 1458, 9.57, 2624, 5.22. These thicknesses were not chosen for particular phase delays, but rather were chosen to provide a substantial variety, spanning orders of magnitude.

The simulation was carried out by calculating the propagation of polarized light through the series of birefringent elements by using an algebraic calculation, specifically using Jones matrix algebra. To understand this method, consider polarized light, which is a form of an electromagnetic wave, that can be represented as an electric field vector, called the Jones vector:

$$E = \begin{bmatrix} E_x e^{i\Phi_x} \\ E_y e^{i\Phi_y} \end{bmatrix}. \tag{1}$$

Since any multiplication of the Jones vector by any complex constant does not modify the state of polarization, it is often convenient to work with normalized Jones vectors. Also, it is emphasized that the Jones vector is used herein only to describe completely polarized light.

The transformation of the state of polarization is represented by a 2×2 matrix, the Jones matrix. Any normal optical components (no depolarization effect, no polarization dependent loss) can be represented by a Jones matrix. For example, a linear birefringent plate having a slow axis oriented at 0°, can be represented by the Jones matrix as follows:

$$M(\Phi, 0) = \begin{bmatrix} e^{-i\phi/2} & 0 \\ 0 & e^{i\phi/2} \end{bmatrix}, \tag{2}$$

where $\Phi$ is the retardation of the waveplate, and it is defined as $$\Phi = \frac{2\pi d (\Delta n)}{\lambda}, \tag{3}$$

where $\Delta n = (n_e - n_o)$ is the difference between the extraordinary refractive index $n_e$ and the ordinary refractive index $n_o$. The term $\Delta n$ represents the extent of birefringence of the material. The birefringence of one or more elements contained in the optical component of the invention can be controllable by subjecting the element to perturbation as discussed herein.

The Jones matrix for a linear birefringent plate oriented at angle $\alpha$ can be represented as $$M(\Phi, \alpha) = R(-\alpha) M(\Phi, 0) R(\alpha), \tag{4}$$

where $R(\alpha)$ is the Jones matrix for a rotator:

$$R(\alpha) = \begin{bmatrix} \cos\alpha & \sin\alpha \\ -\sin\alpha & \cos\alpha \end{bmatrix}. \tag{5}$$

Jones matrix representation is particularly useful because the state of polarization transmitted by a series of optical components can be determined by performing the matrix product in the proper order. The series can be represented by the product matrix of the elementary matrices of each element. Generally, the sequence of association of the elements is known, for example elements 18 as shown in FIG. 1. These can be represented by $M(\Phi,\alpha)$ for each element as described by equation 4, thus resulting in a series of elements forming the group of matrices {M1, M2, . . . , Mk}, where k is equal to the number of elements. It is then sufficient to take the matrix product of the elementary Jones matrices, wherein all terms are expressed in the same Cartesian reference system and in the opposite order with regard to the order the light encounters the elements, i.e.:

$$M = M_k M_{k-1} \ldots M_2 M_1. \quad (6)$$

The wavelength dependent output polarization can be derived using the Jones matrix M in Equation (6), which represents the whole stacked structure. The transfer function of the polarization encoder is readily obtained with the knowledge of the wavelength dependent output polarization. For example, if a polarizer is placed after the stack structure, the output light can be represented as follows, $$E_{out} = \begin{bmatrix} E_x^{out} \\ E_y^{out} \end{bmatrix} = M_p M E_{in},$$

where Mp is the Jones matrix representing a 0 degree polarizer:

$$E_{in} = \begin{bmatrix} E_x^{in} \\ E_y^{in} \end{bmatrix}, M_p = \begin{bmatrix} 1 & 0 \\ 0 & 0 \end{bmatrix}, M = \begin{bmatrix} m_{00} & m_{01} \\ m_{10} & m_{11} \end{bmatrix}.$$

Therefore, the transfer function can be represented as:

$$T = |m_{00} E_x^{in} + m_{01} E_y^{in}|^2.$$

Jones matrix calculation is only one exemplary method to model the transfer function of the polarization encoder. There are other methods, such as the Muller matrix, 4×4 matrix, and other algebraic methods, which are known to those skilled in the art.

The simulated example, of using alternating elements at 45 degrees with respect to the previous element, and every alternating element as a variable element, should not be construed as limiting in any way, and is shown only for illustration purposes. Various other non-illustrated examples were simulated in which, for example, two variable elements were placed at 0 and 45 degrees interlaced between the fixed elements at 0 degrees to obtain greater flexibility of polarization encoding.

Figure 3:
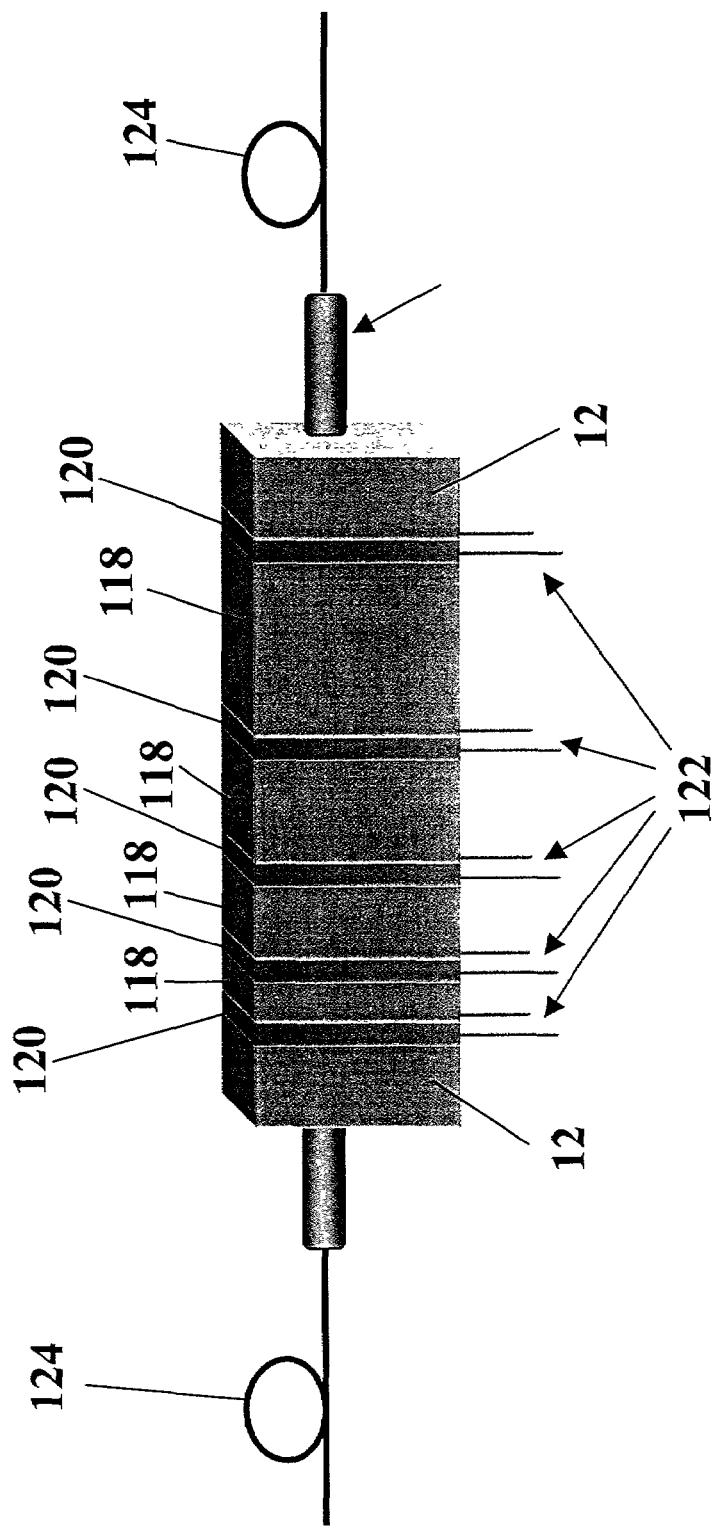
FIG. 3 is a diagram of an exemplary configuration of a stacked polarization encoder.
Figure 4:
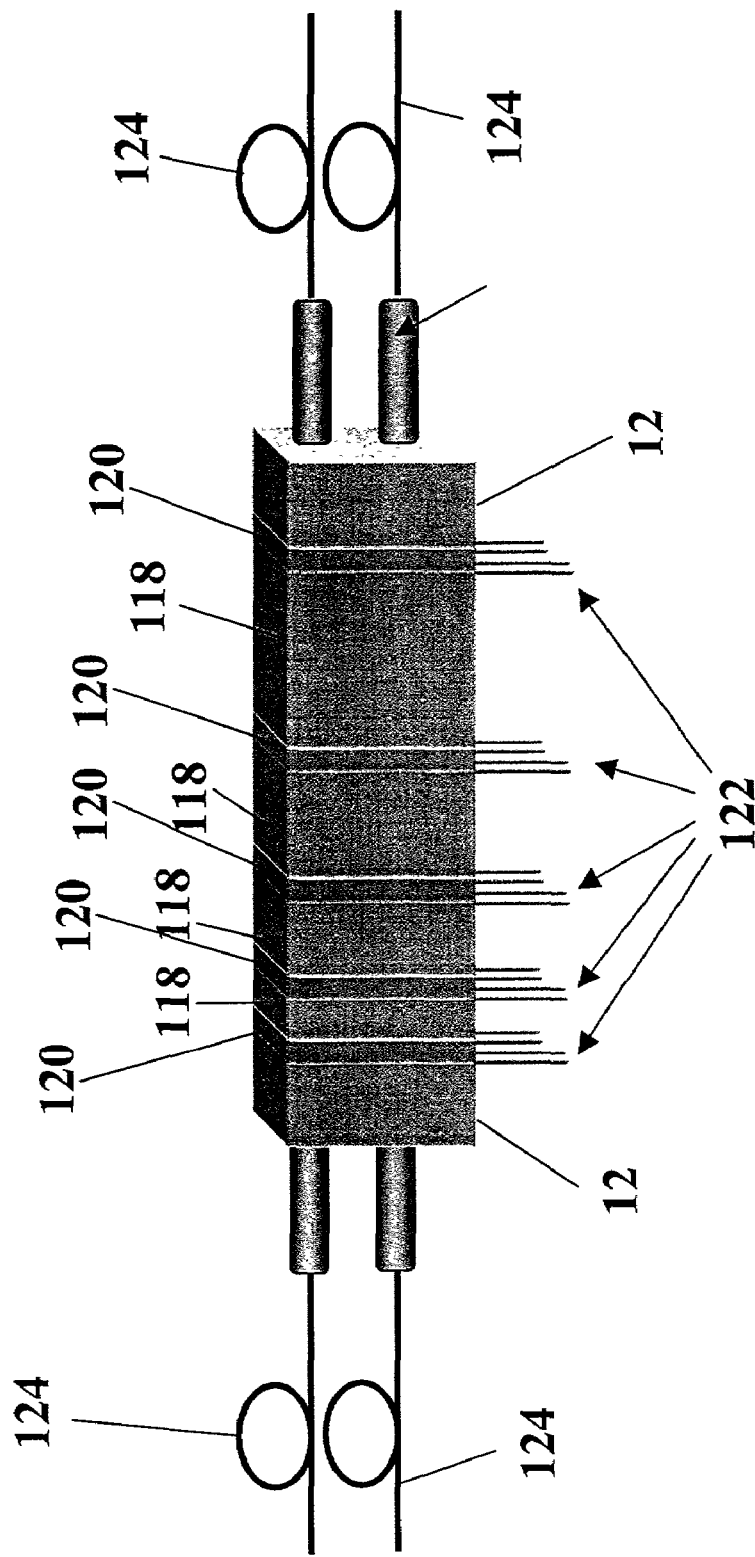
FIGS. 4 is a diagram of another exemplary configuration of a stacked polarization encoder.

Schematic illustrations of various embodiments illustrating the modularity and versatility of the polarization encoder are shown in FIGS. 3, 4, 5A, 5B, and 6. For example, the beam displacing elements may be elements such as calcite crystals, with appropriately cut calcite crystals acting as fixed birefringent elements. As shown in FIGS. 3 and 4, elements 118, for example. The variable elements 120, may be liquid crystals, which can be produced in simple and compact geometry with multiple electrodes 122, for example. Input and output fiber collimators 124 may also be provided as shown in FIGS. 3 and 4.

Figure 5A:
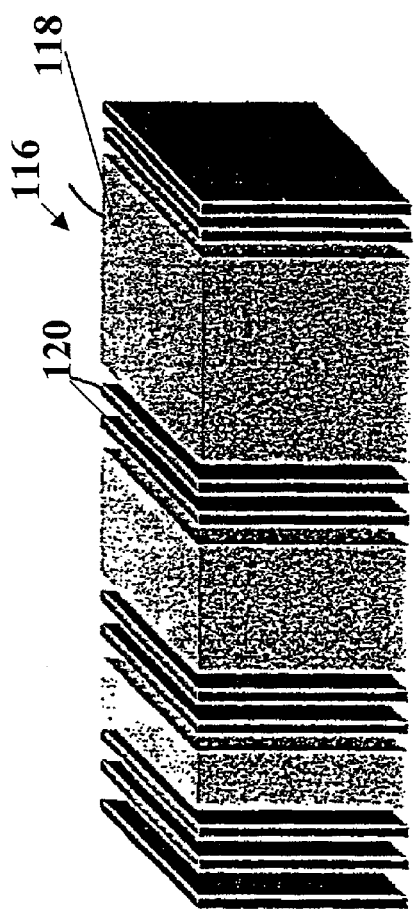
FIG. 5A is a diagram of an exemplary configuration of a stacked polarization encoder showing variable elements having orientations of 0 and 45 degrees.
Figure 5B:
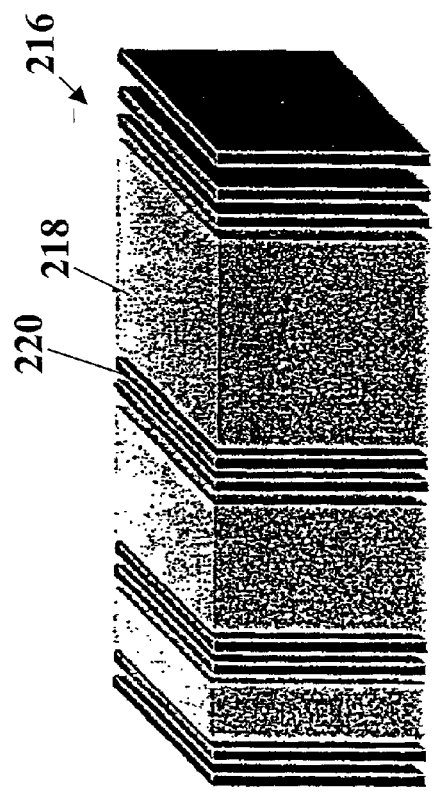
FIGS. 5B is a diagram of an exemplary configuration of a stacked polarization encoder showing variable elements having orientations of 0 and 45 degrees in a reversed sequence than shown in FIG. 5A.
Figure 6:
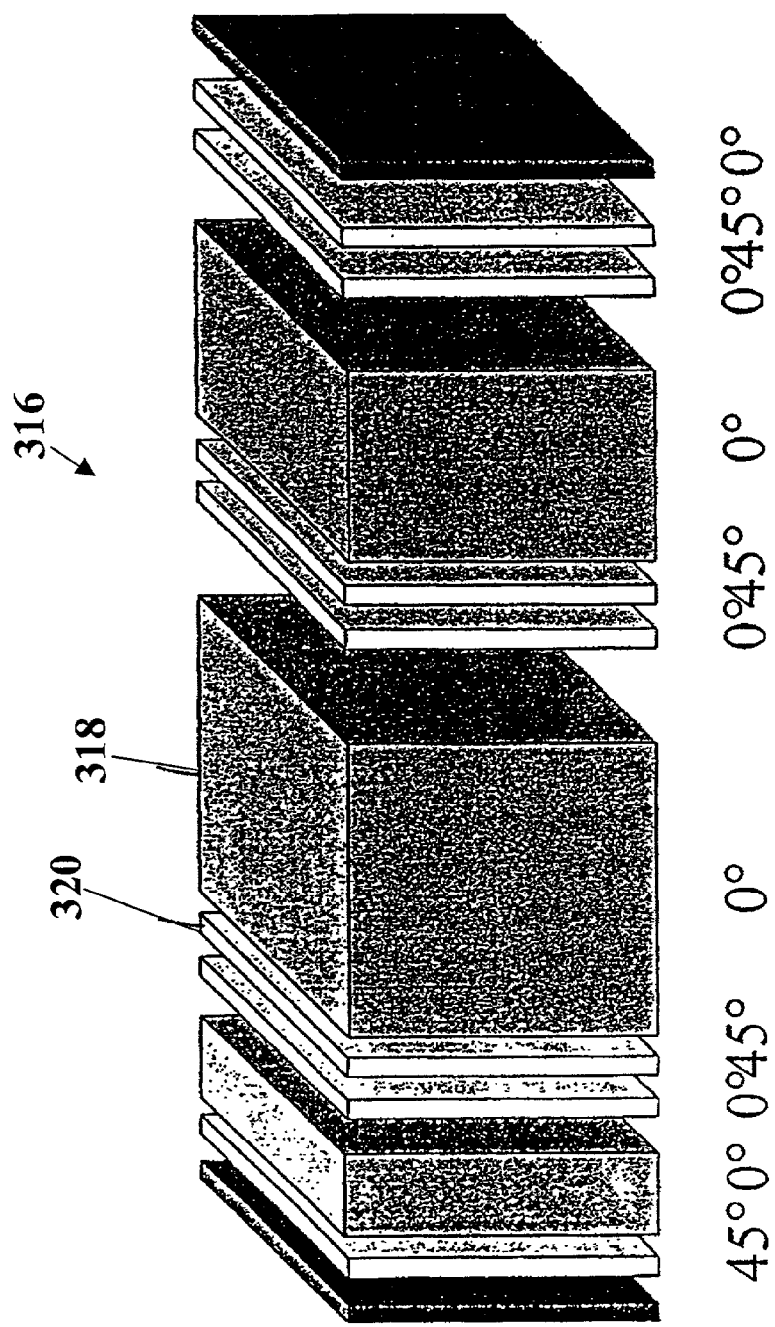
FIGS. 6 is a diagram of another exemplary configuration of stacked birefringent elements.

The polarization encoder stacks may differ in the relative positions of the variable birefringent elements. For example the relative positions of the variable birefringent elements may be reversed in order from an input side to an output side of the encoder. FIGS. 5A and 5B show the variable elements 120 and 220, respectively having two orientations, 0 and 45 degrees. The sequence of these variable elements may be varied. For example, as shown in FIG. 5A, the sequence from left to right of the variable elements 120 positioned between the fixed elements 118 is 0 and 45 degrees. As shown in FIG. 5B, the sequence from left to right of the variable elements 220 positioned between the fixed elements 218 is 45 and 0 degrees. Also, the orientation may vary, and is not limited to 0 and 45 degrees. FIG. 6 illustrates an encoder 316 similar to those of FIGS. 5A and 5B, showing that the fixed elements may be of arbitrary thickness and sequence. That is, the sequence of elements need not be from thinnest to thickest (or thickest to thinnest), but may be positioned in the stack in any sequence.

It is possible to limit the thickness of the device by eliminating the glass plates commonly used for making a tunable liquid crystal element. This is possible by using the adjacent neighboring fixed birefringent element as a sort of a container wall for the liquid crystal materials that it abuts. A film of appropriate transparent electrode conductive material, such as indium tin oxide, is deposited on the surface of calcite crystals comprising the fixed elements for making electrical connection. The surface can be coated with appropriate alignment coatings and rubbed.

In the above process, the birefringent elements take the place of glass in a typical liquid crystal manufacturing process. In the typical process, liquid crystal material is sandwiched between two glass plates, which are held at a uniform spacing. The glass plates help to define the orientation of the liquid crystal molecules. To facilitate the orientation of the molecules, the inner surfaces of the glasses are coated with a special thin film, which is rubbed using cloth along a fixed direction. When these two rubbed glasses are used to make a liquid crystal cell, the liquid crystal molecules at the glass surface are oriented along the rubbing direction. If the glasses are arranged so that the rubbing directions are anti-parallel or parallel to each other, the liquid crystal molecules will become aligned parallel to each other and form a homogeneous linear birefringent waveplate. Generally, the slow axis of the crystal is defined by the rubbing direction.

Figure 7:
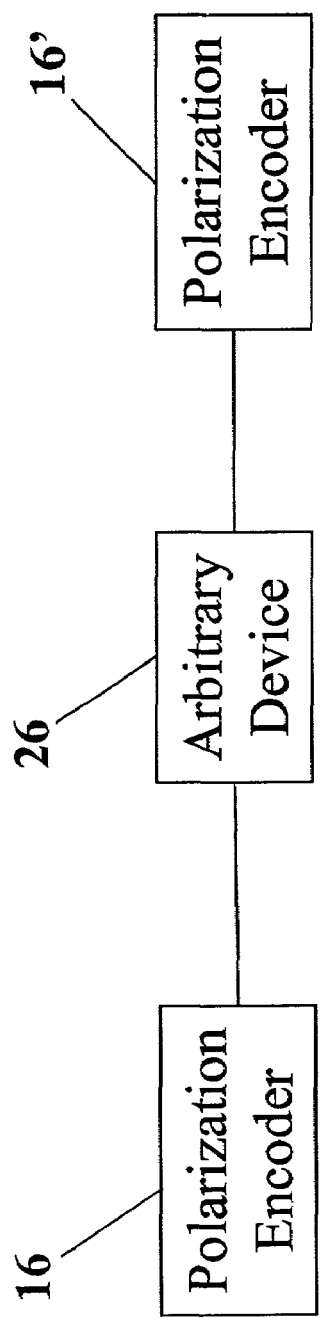
FIG. 7 is a functional block diagram of cascaded encoders.

More than one polarization encoder 16 may be placed in series, or cascaded, in order to provide additional versatility, including the ability to handle switching of a greater number of channels or to provide a more discriminating transfer function of polarization versus wavelength. Likewise, as shown in FIG. 7, a polarization encoder 16 may provide an encoded output to an arbitrary device 26, which in turn is in optical communication with a second polarization encoder 16'. The second encoder 16' may be identical to the first polarization encoder 16 or may have a different configuration or different transfer function. The device 26 may be, for example, an attenuator, an amplifier, a switch or any other optical device. As will be apparent, any such combination of encoders 16 and devices 26 is contemplated within the scope of the present invention. Likewise, such cascaded devices may be iterated an arbitrary number of times such that N encoders 16 cascaded with a number of devices 26 form a complete system. If the pattern of encoder-device-encoder is followed, then the overall device will comprise N encoders and N−1 devices, where each device 26 may be arbitrarily similar to or different from each other device 26. Such a compound structure is referred to herein as an N encoder cascaded system. This compound structure can also be arranged in parallel, thus forming an array structure.

A means of monitoring the encoder's performance may also be incorporated. In an arrangement used to split a signal into two parts, one part transmitting the signal, the other part may be generally unused (particularly if the device is intended as an attenuator to control the power level coupled into such other part transmitting the signal). The unused portion can nevertheless be used in various ways such as to monitor the input power level of the signal, which is reflected by both the transmitted component and the one that is not transmitted. Since the signals are related as conjugates, measurements of one portion will provide an accurate indication of the characteristics of the other as well.

Figure 8:
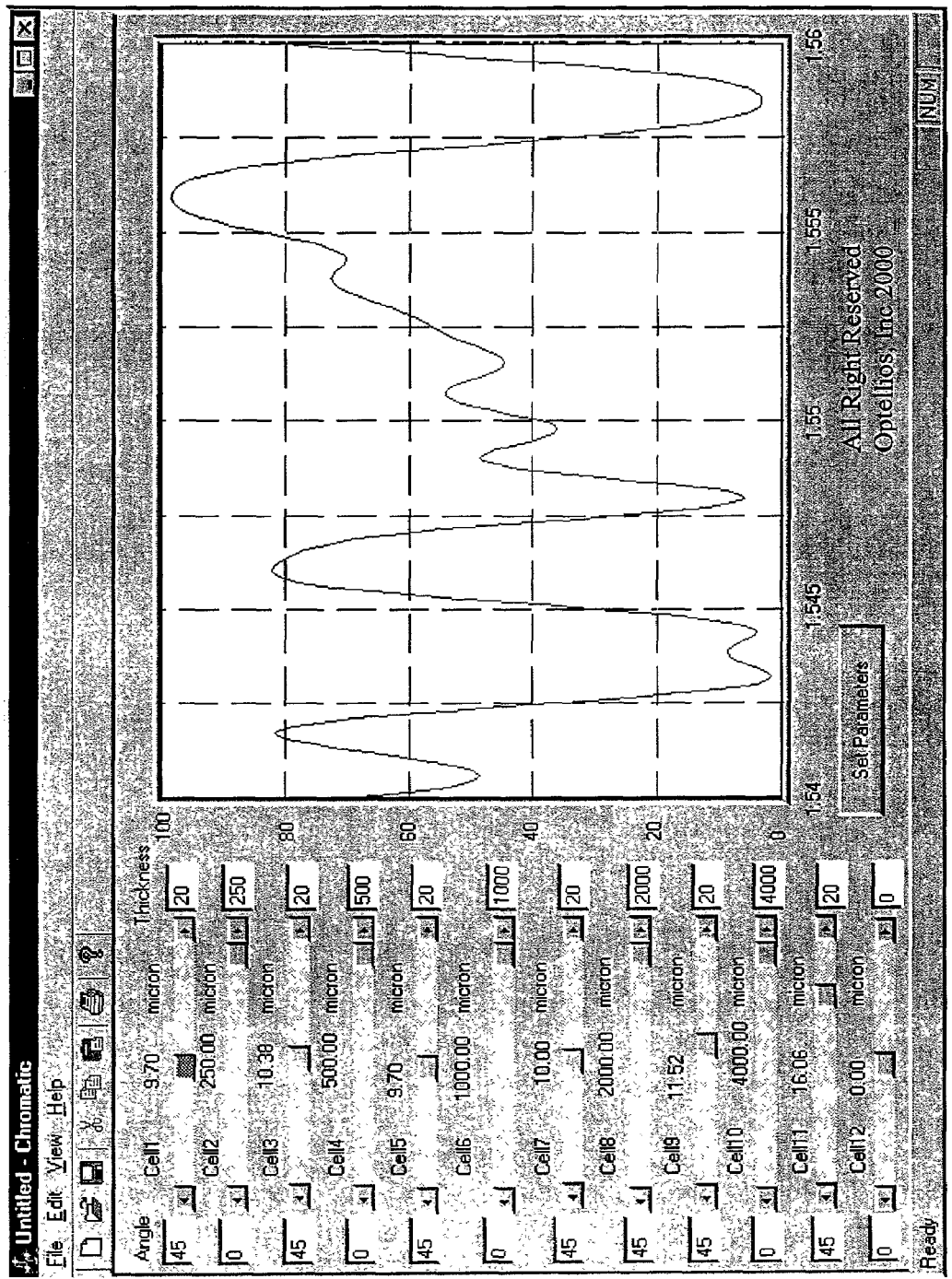
FIG. 8 is an illustration of a simulated monitoring system for a polarization encoder.

In an exemplary embodiment including encoder monitoring software, a graphical interface may be coupled to detectors, for example, to provide a real time graph of transmission intensity as a function of wavelength, permitting the effects of adjustments to be monitored and perhaps used as a feedback input to better tune the overall device. An interface screen in accordance with this embodiment is shown in FIG. 8. For the simulation shown, the power level at the input stage is assumed to be uniformly constant over the wavelength range being displayed. The output power level is shown in the graphical window for the settings shown on the left. The display values on the far left under the heading "Angle", depict the orientation of the birefringent element, in degrees, with respect to the plane polarized light, while the display value on the far right under the heading "Thickness", represent the maximum value of thickness of a particular element, in microns. The values indicated between the two columns represent the selected value of thickness, in microns. In this and following examples, the birefringence of the birefringent elements is assumed to be 0.2.

The polarization encoder 16 may also be employed as part of a wavelength selectable optical switch or switch matrix in a compact geometry without the use of a demultiplexer and a multiplexer. In one embodiment, the encoding stack is configured to rotate the polarization of selected wavelength channels (for example by 90 degrees), while leaving the polarization state of all remaining channels unaltered, the two sets of wavelength channels are physically separated by passing both signal sets through a polarization beam splitter configured to divert a given polarization. In another embodiment, polarization is accomplished by applying electrical voltages to the variable birefringent elements.

Figure 9:
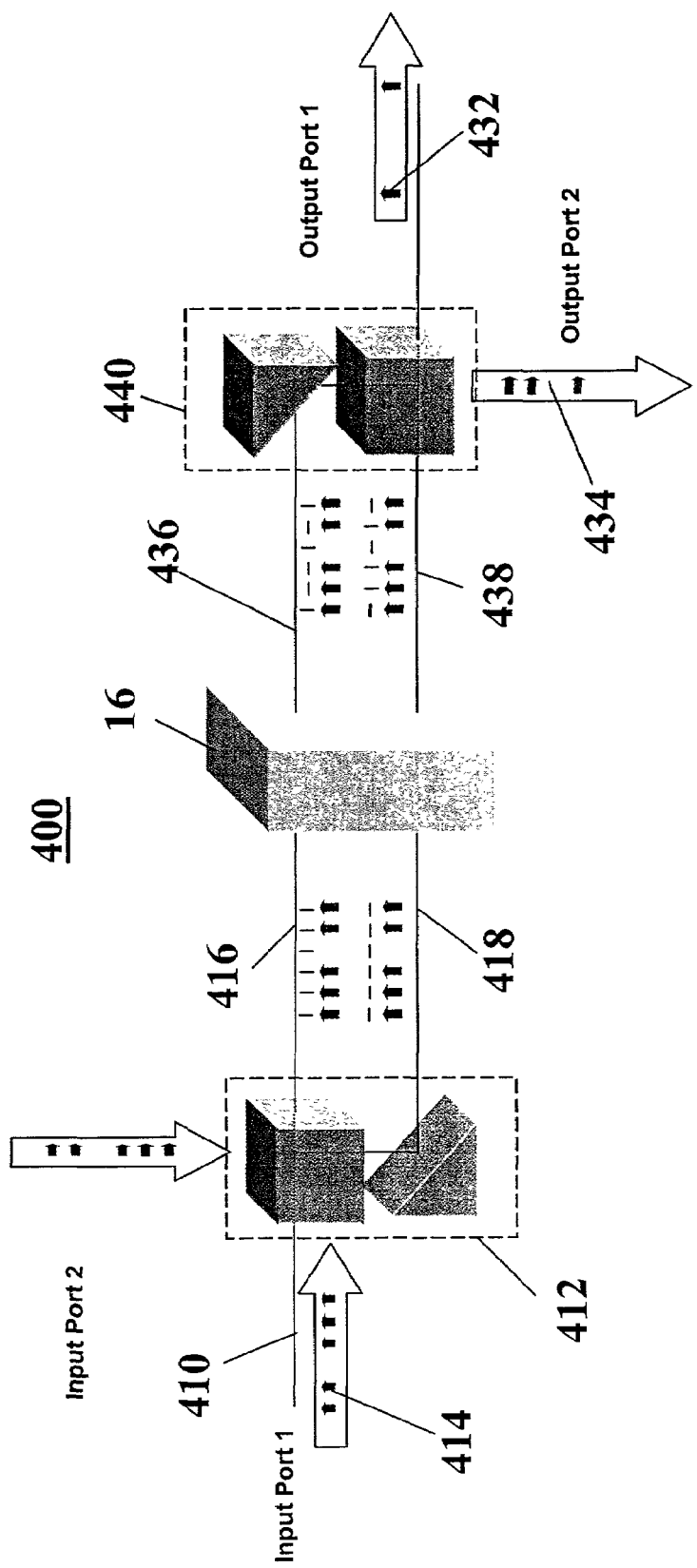
FIG. 9 is a schematic diagram of a tunable optical switch utilizing polarization beam displacers and reflecting prisms in accordance with the present invention.

FIG. 9 is a schematic diagram of a tunable optical switch 400 in accordance with the present invention. The switch 400 can function as a switching matrix. That is, the switch 400 can route different wavelengths provided by a plurality of input ports to any of a plurality of output ports. The selection of output ports may be achieved by using one or more control voltages applied to the switch 400.

In many switching operations, incoming signals are switched to one of a plurality of output ports. Thus, for simplicity sake, optical switch 400 will be described for this application. However, it will become apparent that optical switch 400 may be used to perform more complicated switching functions.

In operation, an incoming polychromatic optical signal 410 of arbitrary polarization, comprising a plurality of wavelength channels, is passed through a polarization splitter and reflecting prism 412. The intensity of a particular wavelength in the two beams 416, 418, depends upon the input polarization state of the light for that wavelength. The arbitrary wavelengths of the incoming signal 410 are represented by arrows 414. Arrows 414 have differing patterns (or colors) to represent different wavelengths. The signal routed to output port 1 comprises wavelengths depicted by arrows 432 and the signal routed to output port 2 comprises wavelengths depicted by arrows 434. Passing the signal 410 through polarization splitter and reflecting prism 412 converts the signal 410 into two intermediate optical signals 416 and 418 having predetermined orthogonal polarizations.

These two signals 416, 418 pass through the polarization encoder 16, which transforms the signal 416 and 418 into optical signals 436 and 438, respectively. After passing through the polarization encoder 16, the polarization of each wavelength is selectably either unchanged or changed to an orthogonal polarization state. However, any two polarization states may be utilized. For example the light may be separated into two beams with S3=+1 and S3=−1, generally referred to as right and left circularly polarized light. However, for the sake of simplicity, this description is in terms of linearly polarized light. The selection of sate of polarization is determined by the desired output port for a particular wavelength.

Signals 436 and 438 comprise the same wavelengths, however the signals 436 and 438 are polarized such that Stokes parameters for each wavelength in one signal (e.g., 436) are the negative of the Stokes parameters for the same wavelength in the other signal (e.g., 438), as indicated by the horizontal and vertical lines placed above each wavelength in FIG. 9. This relationship between the Stokes parameters of the same wavelengths for signals 436 and 438 is achievable by selecting the thickness of the elements of the polarization encoder 16, by applying a voltage to the variable birefringent elements of polarization encoder 16, or a combination thereof. The two signals are combined and directed, by polarization beam splitter and reflecting prism 440, to either output port 1 or output port 2.

Figure 10:
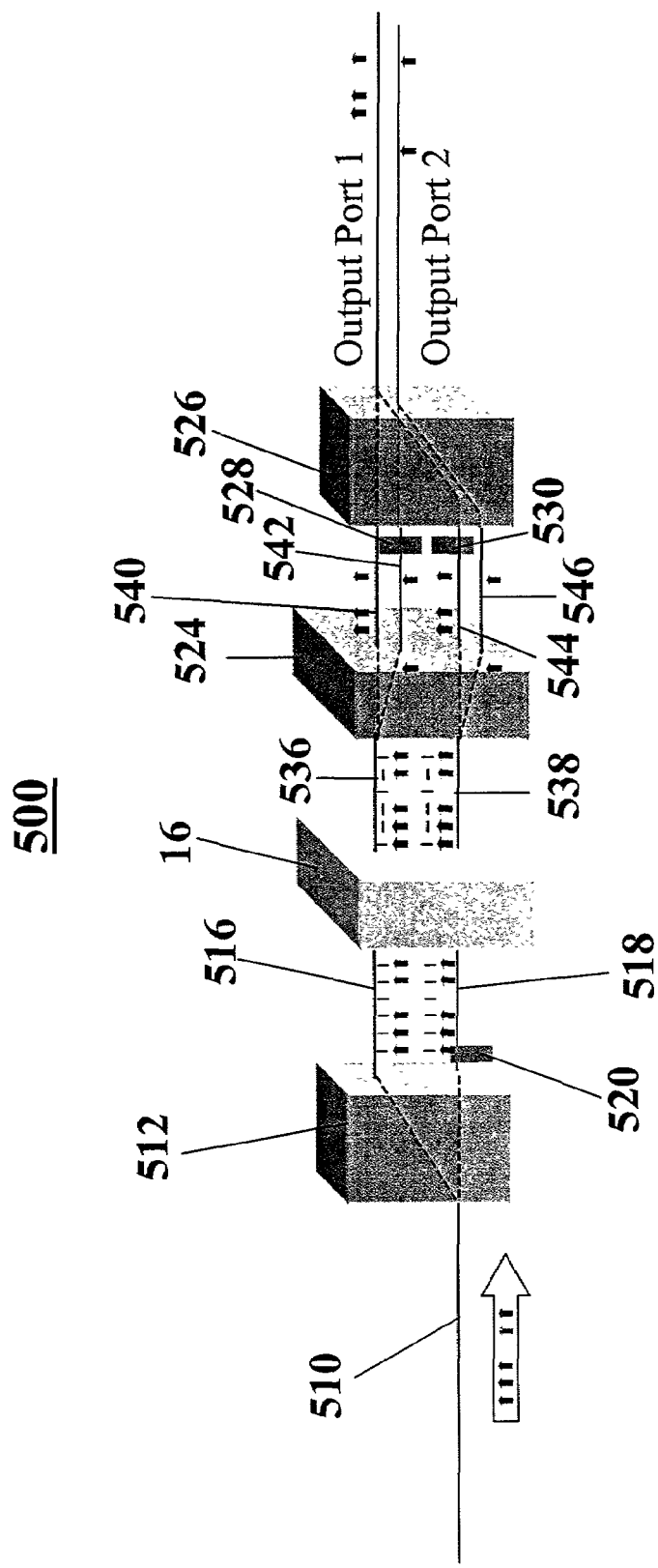
FIG. 10 is a schematic diagram of a tunable optical switch utilizing calcite crystals in accordance with the present invention.

A tunable optical switch 500 in accordance with the present invention may comprise a calcite beam displacer as shown in FIG. 10. Tunable optical switch 500 comprises calcite beam displacer 512, polarization encoder 16, calcite beam displacer 524, beam combiner 526, and 45 degree half-wave plates 520, 528, and 530. Incoming polychromatic optical signal 510 of arbitrary polarization, comprising a plurality of wavelength channels, is passed through a calcite beam displacer 512. Passing the signal 510 through calcite beam displacer 512 converts the signal 510 into two intermediate optical signals having predetermined orthogonal polarizations. The 45 degree half-wave plate 520 change the polarization of one path such that the two intermediate optical signals 516 and 518 have the same state of polarization. These two signals 516, 518 pass through the polarization encoder 16, which transforms the signal 516 and 518 into optical signals 536 and 538, having the desired wavelength dependent state of polarization. As shown in FIG. 10, the same wavelengths of signals 516 and 518 have the same states of polarization. The polarization of each wavelength is altered to a desired state of polarization by polarization encoder 16. The resulting signals, 536 and 538, comprise wavelengths having different polarization states in accordance with the desired output port for each wavelength. The polarization state for the same wavelength in each of signals 536 and 538 is the same.

Calcite beam displacer separates each of signals 536 and 538 into two signal beams in accordance with polarization state. Signal 536 is separated into signals 540 and 542, and signal 538 is separated into signals 544 and 546. Thus, as shown in FIG. 10, signals 540 and 544 comprise wavelengths that had the same polarization, and signals 542 and 546 comprise wavelengths, different from those contained in signals 540 and 544, that had the same polarization. The 45 degree half-wave plates 528 and 530 change the state of polarization of the optical signals 542 and 544, respectively, such that optical signals 540 and 542 have the same polarization, and optical signal 544 and 546 have the same polarization. Signals 540, 542, 544, and 546 are combined and directed to the desired output port by beam combiner 526. Different wavelength thus can be routed into different output ports. As shown in FIG. 10, signals 540 and 540 are directed to output port 1 and signals 542 and 546 are directed to output port 2.

Figure 11:
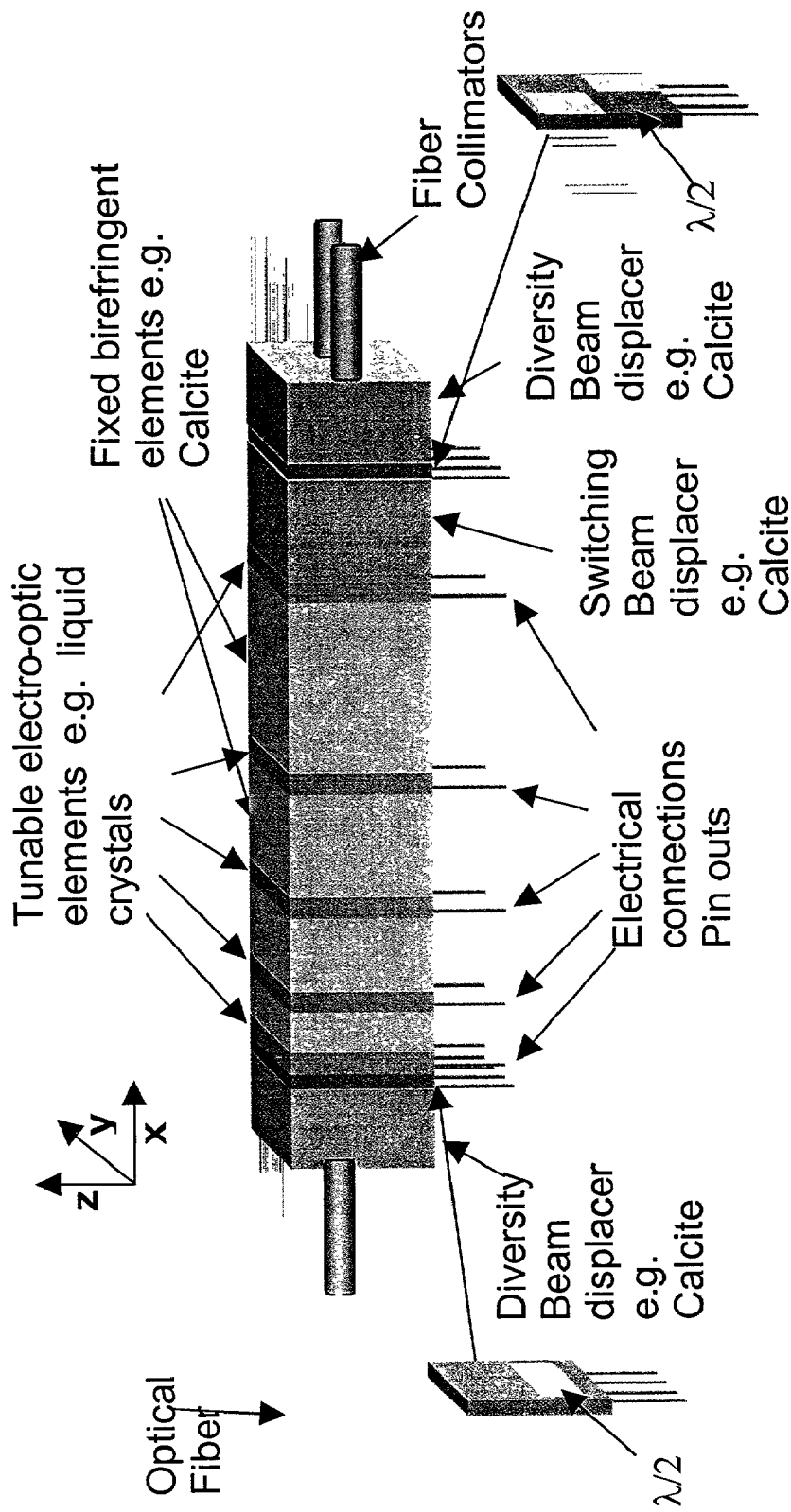
FIG. 11 is a diagram of an exemplary configuration of tunable optical switch.
Figure 12:
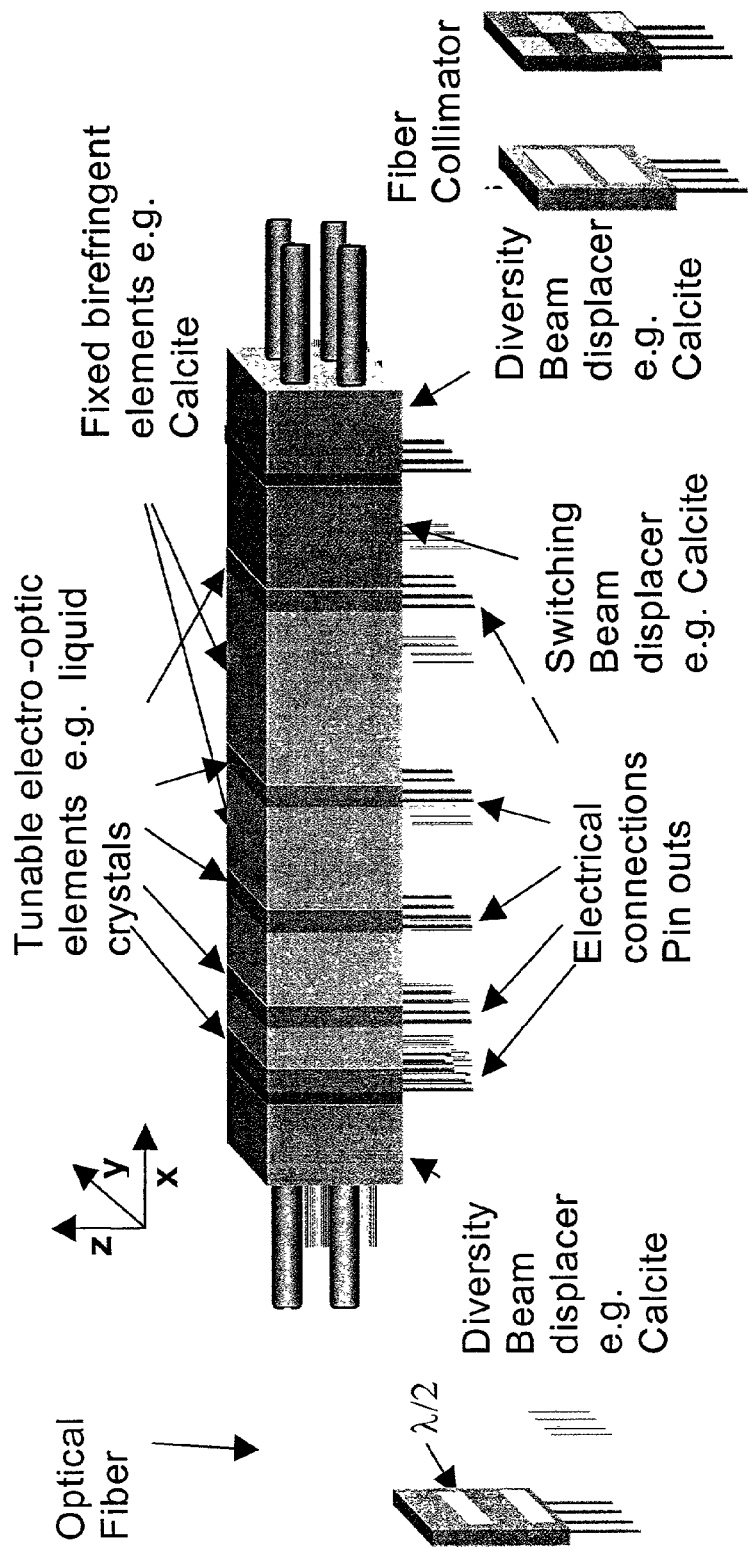
FIG. 12 is a diagram of another exemplary configuration of tunable optical switch.

A tunable optical switch in accordance with the present invention, comprising calcite beam displacers has the advantage of ease of fabrication and alignment, because the crystals may be easily stacked. Also, this configuration may be very compact, thus reducing the size of the switch, as shown in FIGS. 11 and 12. In the configurations shown in FIGS. 11 and 12, the beam displacing elements can be elements such as appropriately cut calcite crystals functioning as fixed birefringent elements. The tunable elements may be liquid crystal elements, which can be produced in simple and compact geometry with multiple electrodes if necessary. Furthermore, any size switching matrix may be configured by utilizing combination of the configurations shown in FIGS. 11 and 12. The switches can also be arranged in such a way that at least one output of a first switch is connected to at least one input of a second switch, such that the switches are connected in series and/or in parallel.

It is also possible to further reduce the thickness of the herein-described tunable optical switch by eliminating the glass plates commonly used for making tunable liquid crystal elements. This is accomplished by using the adjacent fixed birefringent elements as the container walls for the liquid crystal materials, by depositing ITO on the surface of the calcite crystals, by coating the elements with the appropriate alignment coatings, and by rubbing.

Figure 13:
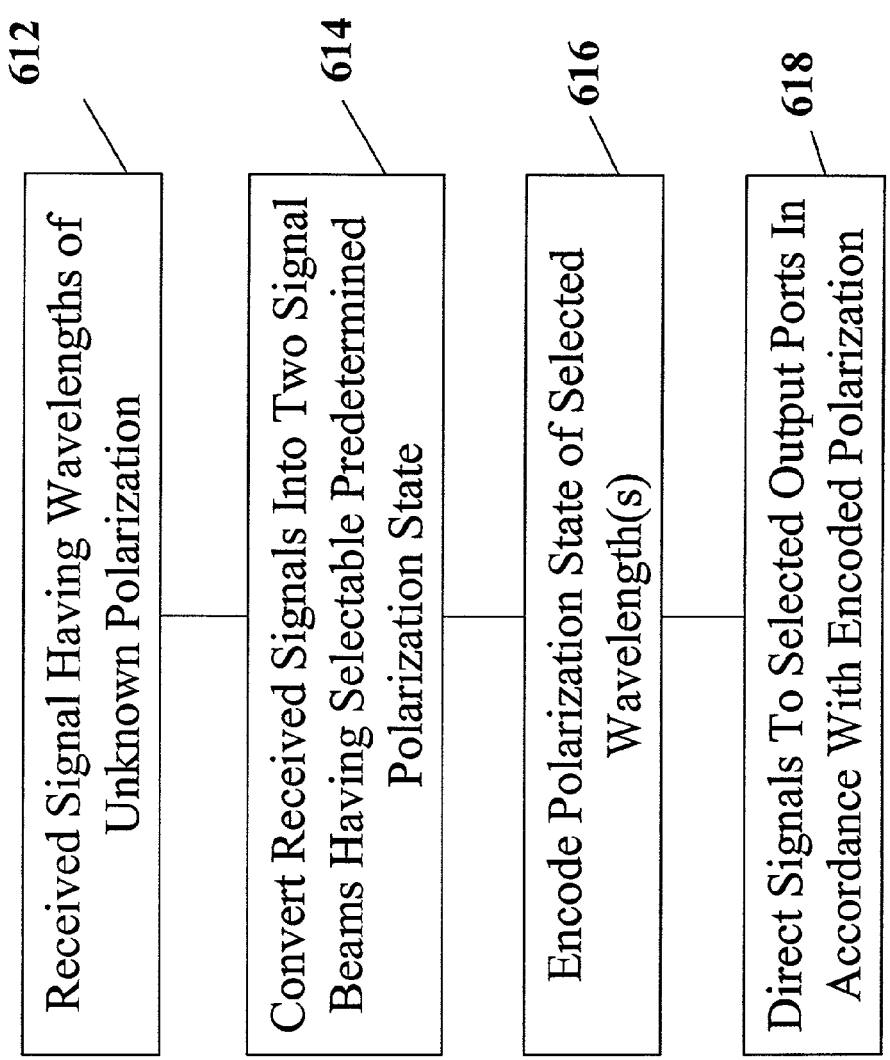
FIG. 13 is a flow diagram of an exemplary process for tunably switching optical signals utilizing a wideband polarization encoder.

FIG. 13 is a flow diagram of an exemplary process for tunably switching optical signals in accordance with an encoded polarization. The exemplary process depicted in FIG. 13 is described herein with respect to the configuration of the tunable optical switch shown in FIG. 9. However, the process depicted in FIG. 13 is not restricted to the configuration shown in FIG. 9. At step 612, an incoming polychromatic optical signal of arbitrary polarization, comprising a plurality of wavelength channels, is received (for example signal 410). The received signal is converted into two signal beams (by a polarization splitter and reflecting prism, for example), wherein the polarization of each beam is selectable, at step 614. At step 616, the polarization states of selected wavelengths of the optical signals are encoded (for example, by a wavelength dependent, non-multiplexer polarization encoder). The polarization states are encoded in accordance with the desired output port for a particular wavelength. That is, a wavelength is encoded with the state of polarization that will ultimately result in that wavelength being directed to the desired output port. The signals comprising encoded polarization states are recombined and directed to selected output ports in accordance with the encoded polarization, at step 618. Thus, wavelengths can be directed to selected output ports by encoding wavelengths with the polarization state needed to direct a particular wavelength to a selected output port.

Figure 14A:
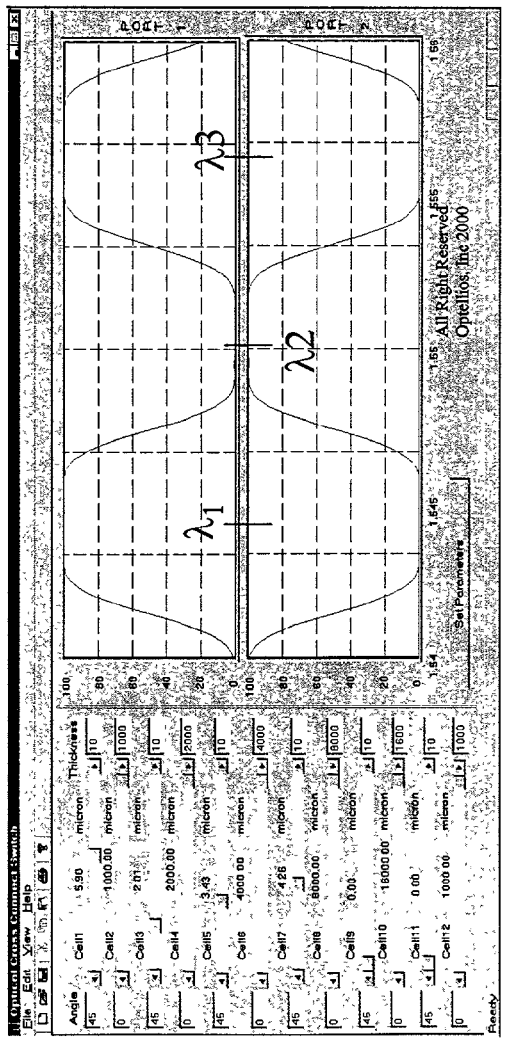
FIG. 14A is a graph of the transmitted signal intensity versus wavelength for an exemplary configuration of a tunable polarization encoder configured as a tunable polarizing interleaver.
Figure 14B:
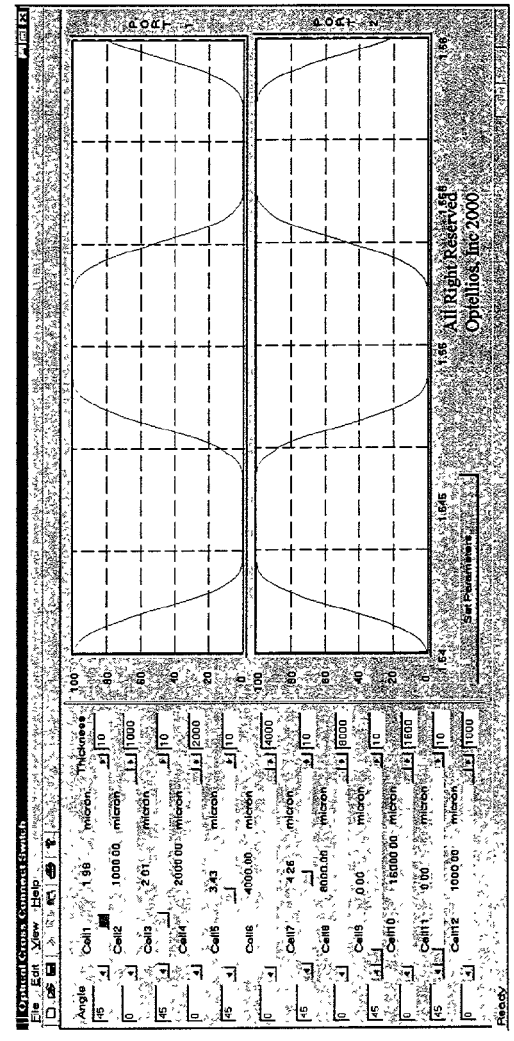
FIG. 14B is a graph of the transmitted signal intensity versus wavelength for another exemplary configuration of a tunable polarization encoder configured as a tunable polarizing interleaver.

The polarization encoder described herein is also configurable as a tunable polarizing interleaver, wherein the channel spacing and shape of the transfer function are controllable. The polarization states of the various channels of the tunable polarizing interleaver, are controllable. For example, as shown in FIGS. 14A and 14B, the neighboring channels (wavelengths) have orthogonal polarization states. FIGS. 14A and 14B show graphs of the transmitted signal intensity versus wavelength for two exemplary configurations of a tunable polarization encoder configured as a tunable polarizing interleaver. The values indicated on the left-hand column, under the heading of "Angle", represent the orientation in degrees, of each element, or cell, in the stack, with respect to the plane of polarized light. Thus, as shown in FIGS. 14A 14B, the orientation of the elements (cells) of each stack alternate between 45 degrees and 0 degrees, wherein the first element has an orientation angle of 45 degrees and the last element has an orientation angle of 0 degrees. The values in the column under the heading "Thickness", represent the maximum optical thickness of the corresponding element in microns.

The values indicated between the two columns represent the selected value of thickness, in microns. The optical thickness of a polarization encoder in accordance with the present invention may be adjusted by adjusting the physical thickness of an element, by changing the birefringence of an element, or a combination thereof. As described herein, the birefringence may be adjusted/controlled mechanically, thermally, optically, electromagnetically (such as voltage), or a combination thereof. For simulation purposes, the optical thickness is an entered parameter. For the configuration depicted in FIG. 14A, the thickness of the first element is 5.9 microns, and the thickness of the first element depicted in FIG. 14B is 1.98 microns. Each window of each of FIGS. 14A and 14B illustrates intensity as a function of wavelength for each output port. Thus, the top window of FIG. 14A represents output port 1, and the bottom window of FIG. 14A represents output port 2. Similarly, the top window of FIG. 14B represents output port 1, and the bottom window of FIG. 14B represents output port 2.

As shown in FIGS. 14A and 14B, the tunable polarization encoder is configured to interleave channels between output ports 1 and 2. That is channels having wavelengths centered at $\lambda_1$ and $\lambda_3$ are directed to output port 1, and the channel having a wavelength centered between $\lambda_1$ and $\lambda_3$ (i.e., $\lambda_2$) is directed to output port 2.

Figure 15:
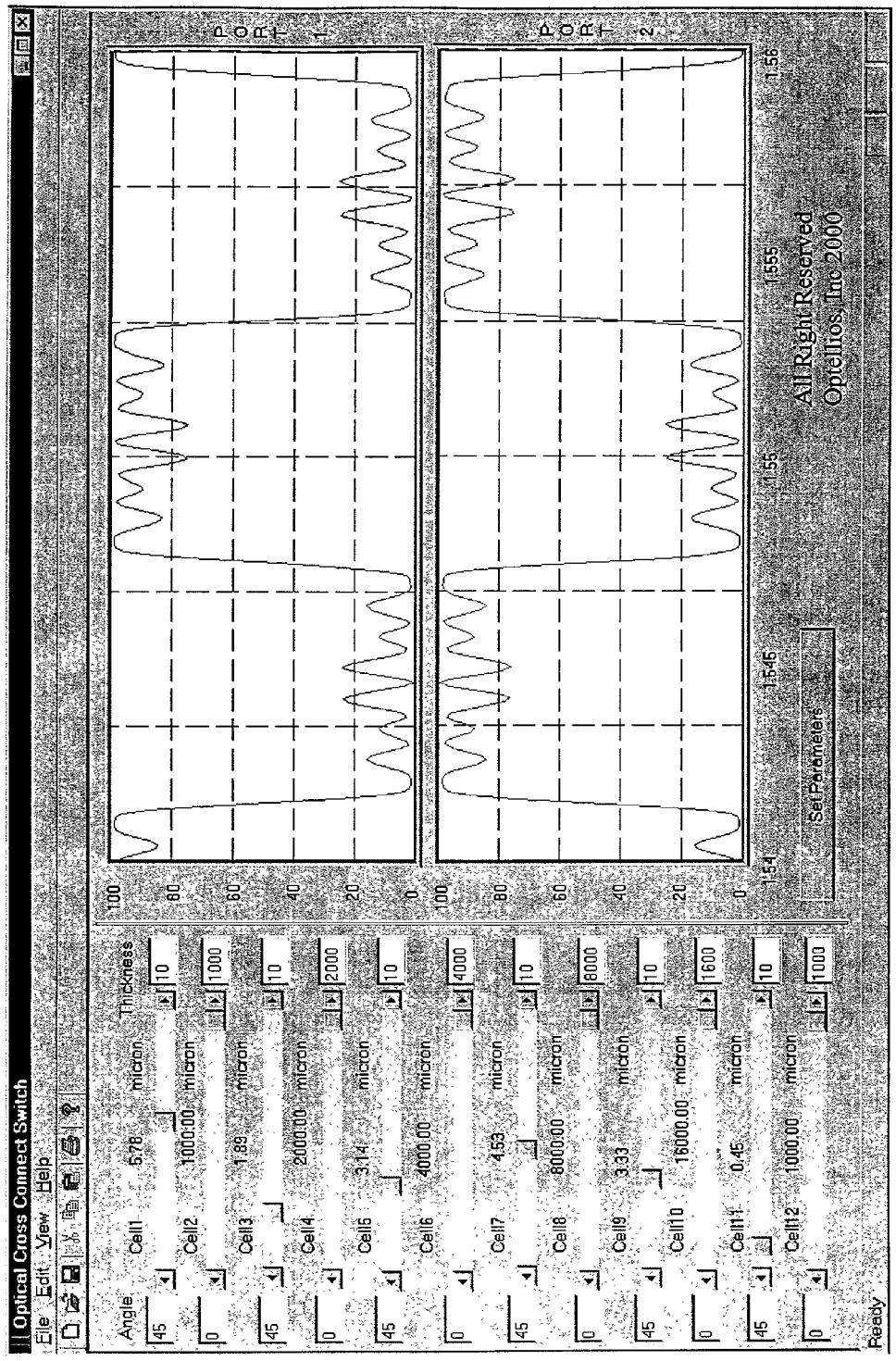
FIG. 15 is a graph of transmitted intensity versus wavelength for a configuration of the polarization encoder having a sharper transition between adjacent channels than the configurations depicted in FIGS. 14A and 14B.
Figure 16A:
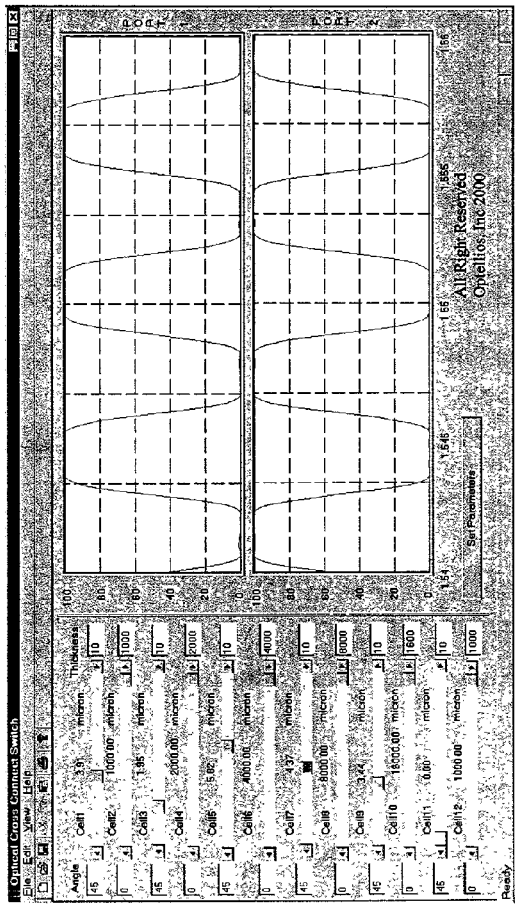
FIG. 16A is a graph of transmitted intensity versus wavelength illustrating different channel spacing than depicted in previous configurations.
Figure 16B:
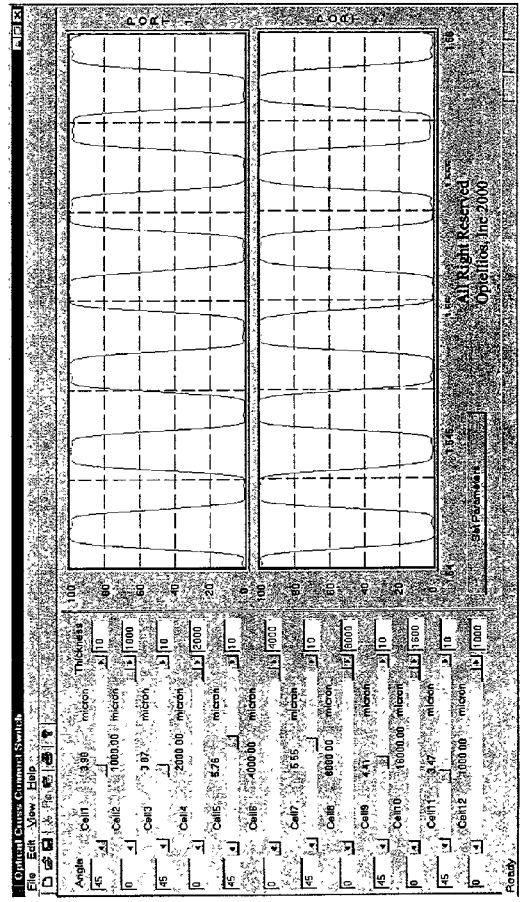
FIG. 16B is another graph of transmitted intensity versus wavelength illustrating different channel spacing than depicted in previous configurations.
Figure 17:
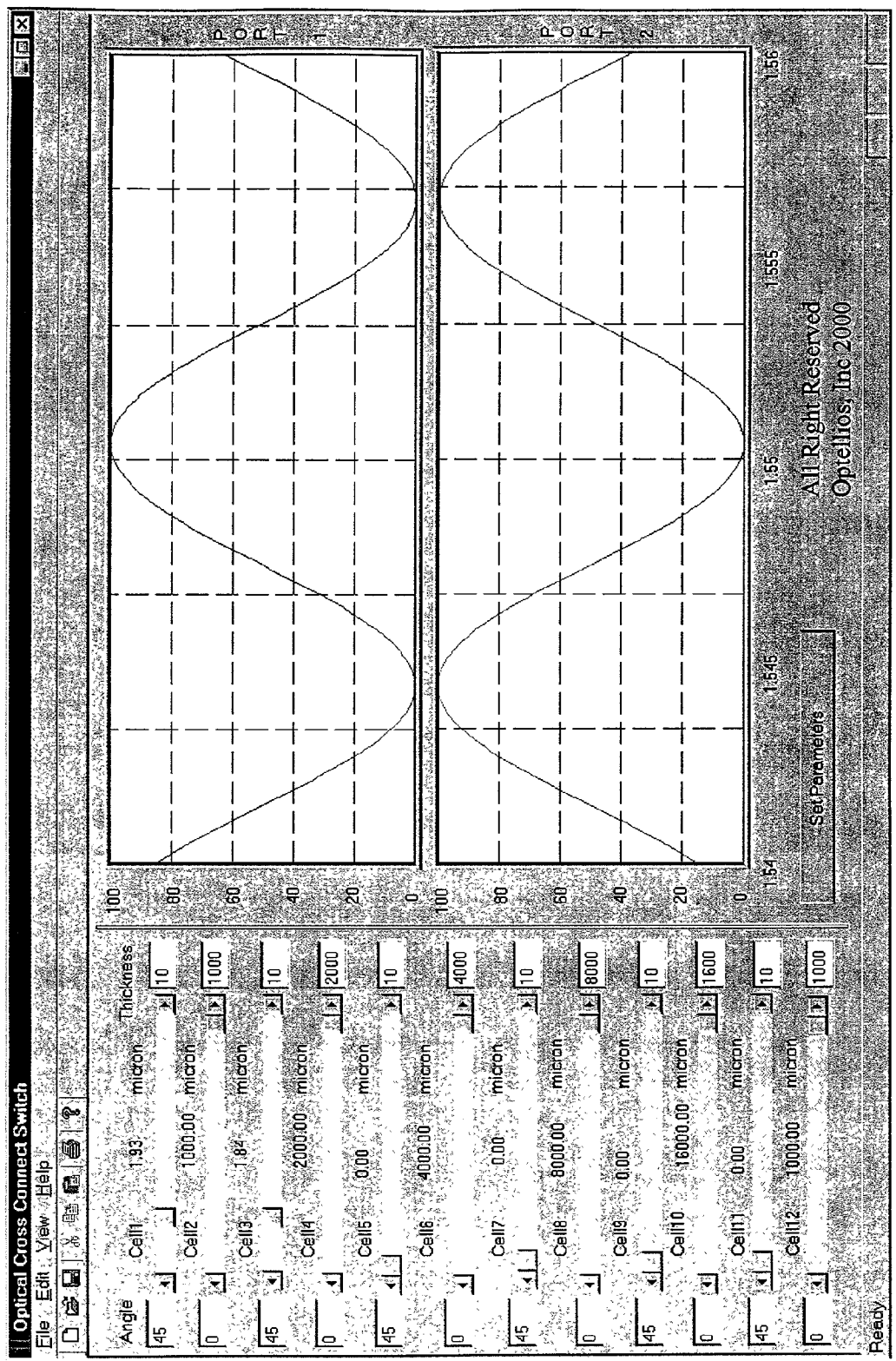
FIG. 17 is a graph of transmitted intensity versus wavelength having a sinusoidal shape.
Figure 18A:
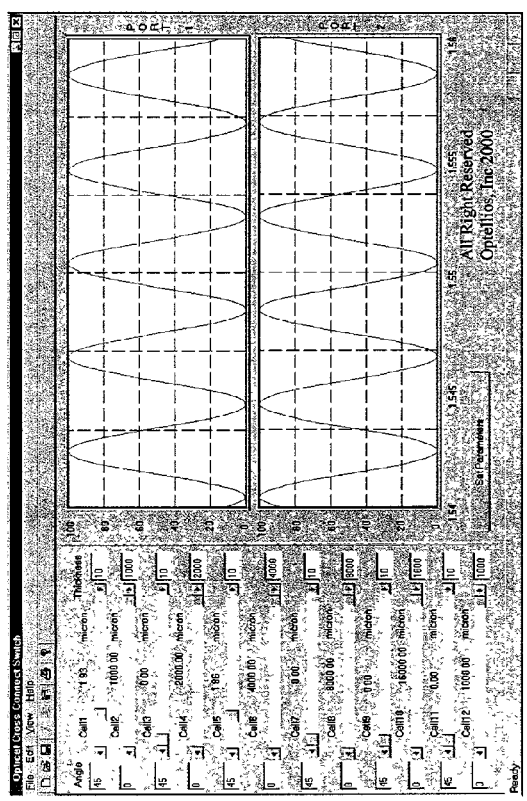
FIG. 18A is a graph of transmitted intensity versus wavelength for an alternate embodiment of the polarization encoder, wherein the optical wavelengths differ in only two elements.
Figure 18B:
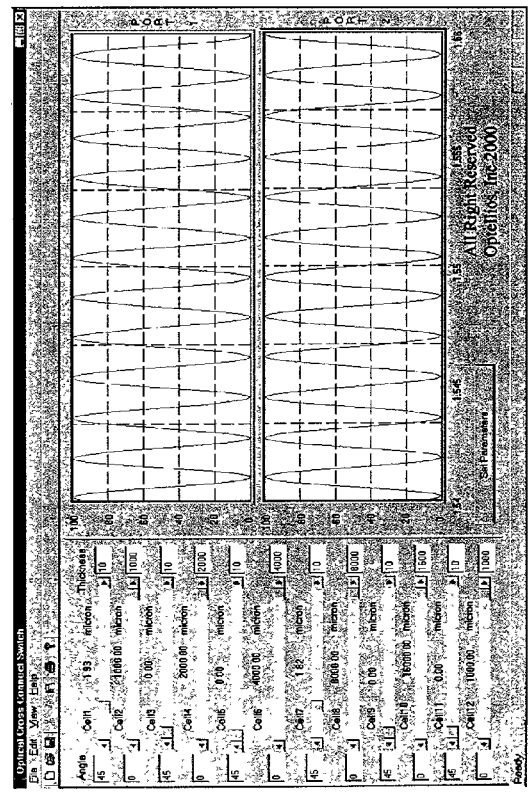
FIG. 18B is graph of transmitted intensity versus wavelength for another alternate embodiment of the polarization encoder, wherein the optical wavelengths differ in only two elements.

The polarization encoder is easily tuned. That is, parameters such as optical thickness and orientation can be adjusted to achieve a desired transfer function. FIGS. 15, 16A, 16B, 17, 18A, and 18B illustrate various exemplary transfer functions of a polarization encoder utilized as an interleaver/switch. FIG. 15 shows a graph of transmitted intensity versus wavelength for a configuration of the polarization encoder having a sharper transition between adjacent channels than the configurations depicted in FIGS. 14A and 14B. The values of optical thickness for some of the elements were adjusted to achieve the graph of FIG. 15. The transition edges are much sharper than those depicted in FIGS. 14A and 14B, however the tops of each channel have some ripple. FIGS. 16A and 16B show graphs of transmitted intensity versus wavelength having different channel spacing. As shown, the channel spacing is easily controlled by adjusting the optical thickness of each element. FIG. 17 shows a graph of transmitted intensity versus wavelength having a sinusoidal shape. Again, only the optical thickness of selected elements was adjusted to obtain this transfer function. FIGS. 18A and 18B show graphs of transmitted intensity versus wavelength for alternate embodiments of the polarization encoder, wherein the optical wavelengths differ in only two elements. That is only the values of optical thickness for elements 5 and 7 differ in FIGS. 18A and 18B.

As illustrated in FIGS. 14A through 18B, the polarization encoder may be easily tuned to provide a desired transfer function. Tuning may comprise heuristic and/or empirical determination of specific values of parameters, such as optical thickness and orientation, for example. It has been observed that specific transfer functions (i.e., curve shapes) are obtainable by simply adjusting the values of optical thickness of various elements until the desired shape is achieved, within a few minutes. Thus, an exemplary design approach may comprise utilizing a simulator to adjust parameters (e.g., values of optical thickness, number fixed elements, number of variable elements, and value of orientation for each element), until the desired transfer function is observed, and then configure the polarization encoder in accordance with those parameter values. The desired transfer function can be characterized by at least one attribute of the light signal, such as intensity, polarization, and phase.

Figure 19:
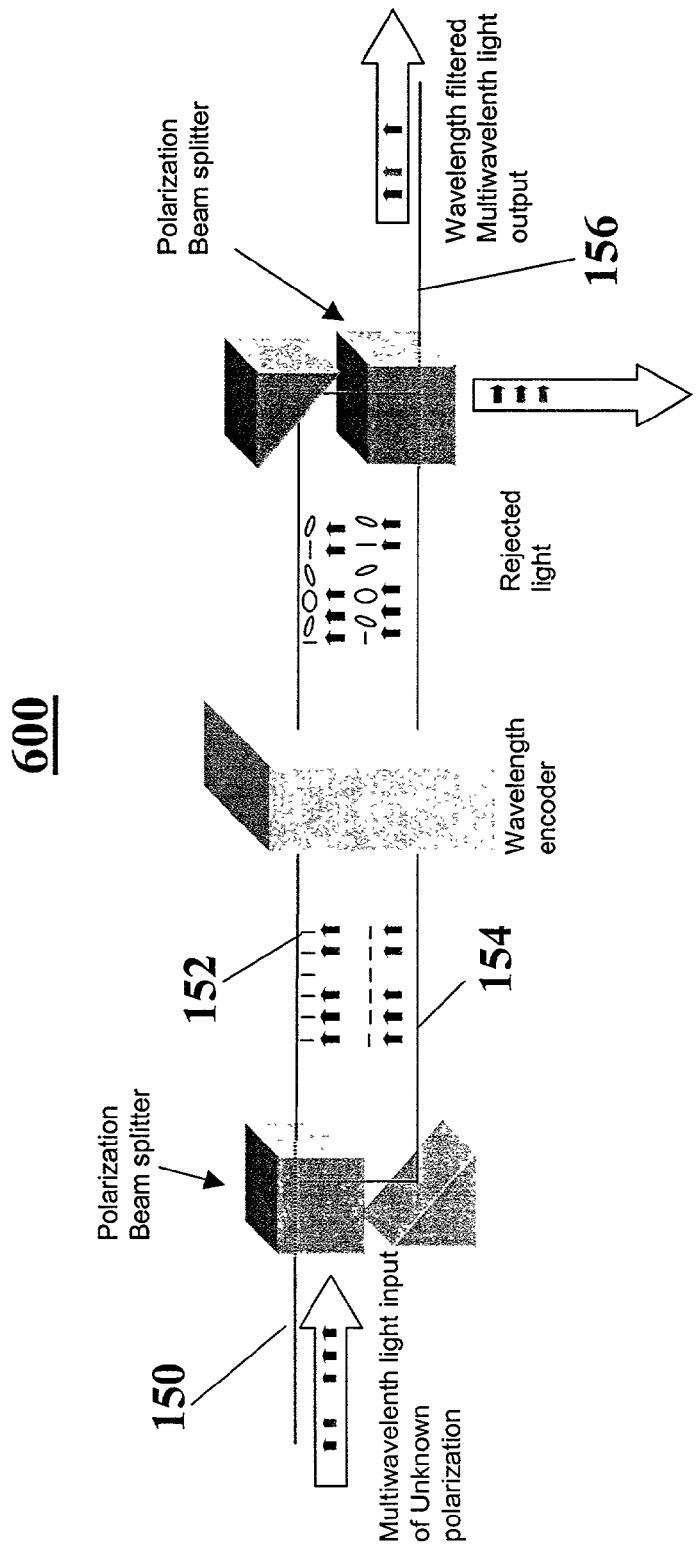
FIG. 19 is a schematic diagram of an optical power level controller utilizing polarization beam displacers and reflecting prisms.
Figure 20:
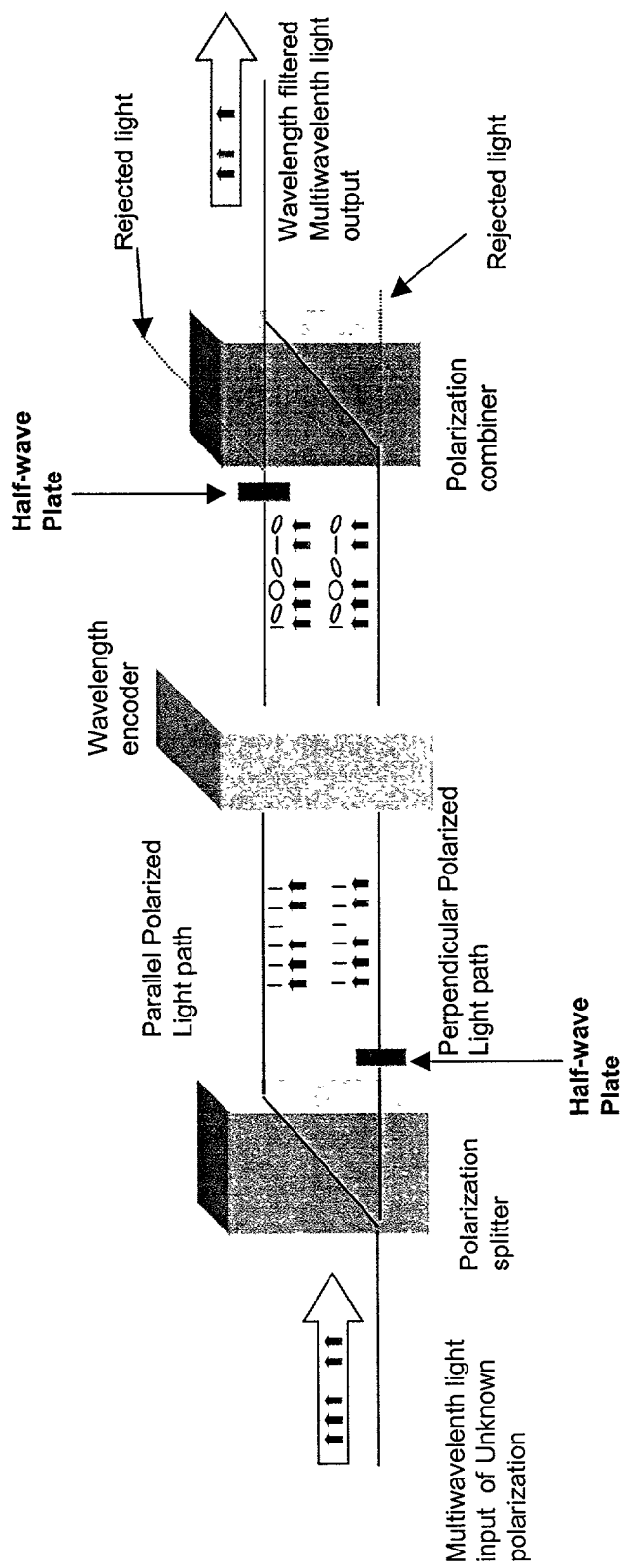
FIG. 20 is a schematic diagram of an optical power level controller utilizing calcite crystals.

Other embodiments of the polarization encoder may be used as a wavelength dependent optical level controller (or attenuator) as shown in FIGS. 19 and 20. FIG. 19 shows a tunable optical level controller 600 utilizing a polarization beam displacer and reflecting prism, as previously described herein. FIG. 20 shows a tunable optical level controller utilizing calcite crystals as also previously described. The optical level controller, in accordance with the present invention, functions in a similar manner to the tunable optical switch as previously described. Referring to tunable optical level controller 600, incoming light 150 of any arbitrary polarization is converted into two known orthogonal polarized states, in the form of two beams of light 152, 154. These two beams 152, 154 pass through the polarization encoders 156, which transforms the light into two signal beams wherein the Stokes parameters have a particular set of values for wavelengths of one beam and exactly the opposite sign Stokes parameter for respective wavelengths of the other beam (as indicated by the ellipses over the individual wavelengths depicted in FIG. 19). The two beams 152, 154 are combined into a single beam 156 to obtain a polarization insensitive wavelength dependent attenuator.

The encoded polarization imparted to the signals by the wavelength dependent power level controller differs from polarization imparted by the optical switch. In the optical switch, polarization was imparted to the signal to direct selected wavelengths to selected output ports, whereas, in the optical level controller, polarization is imparted to adjust the level of the optical signal. Thus, as depicted by the ellipses above the wavelengths in FIGS. 19 and 20, the wavelength specific encoded polarization is designed to adjust the level of the optical signal.

In general, a power level controller as described herein may be used in combination with other devices such as an optical amplifier. The gain of an optical amplifier is generally non-uniform and the power level of the signal entering the amplifier may also be unequal. However to achieve uniform gain for all wavelength signals, the power level of the signal entering the amplifier may have to be adjusted to an appropriate value for each wavelength band using the device of the invention as a power level controller or spectrum adjuster to flatten or otherwise normalize the response. In such a case, the objective may be equal power at the output for all wavelengths, and the input power may be different at each wavelength, which can be normalized by adjusting the control parameters, as shown in FIG. 21.

Figure 21:
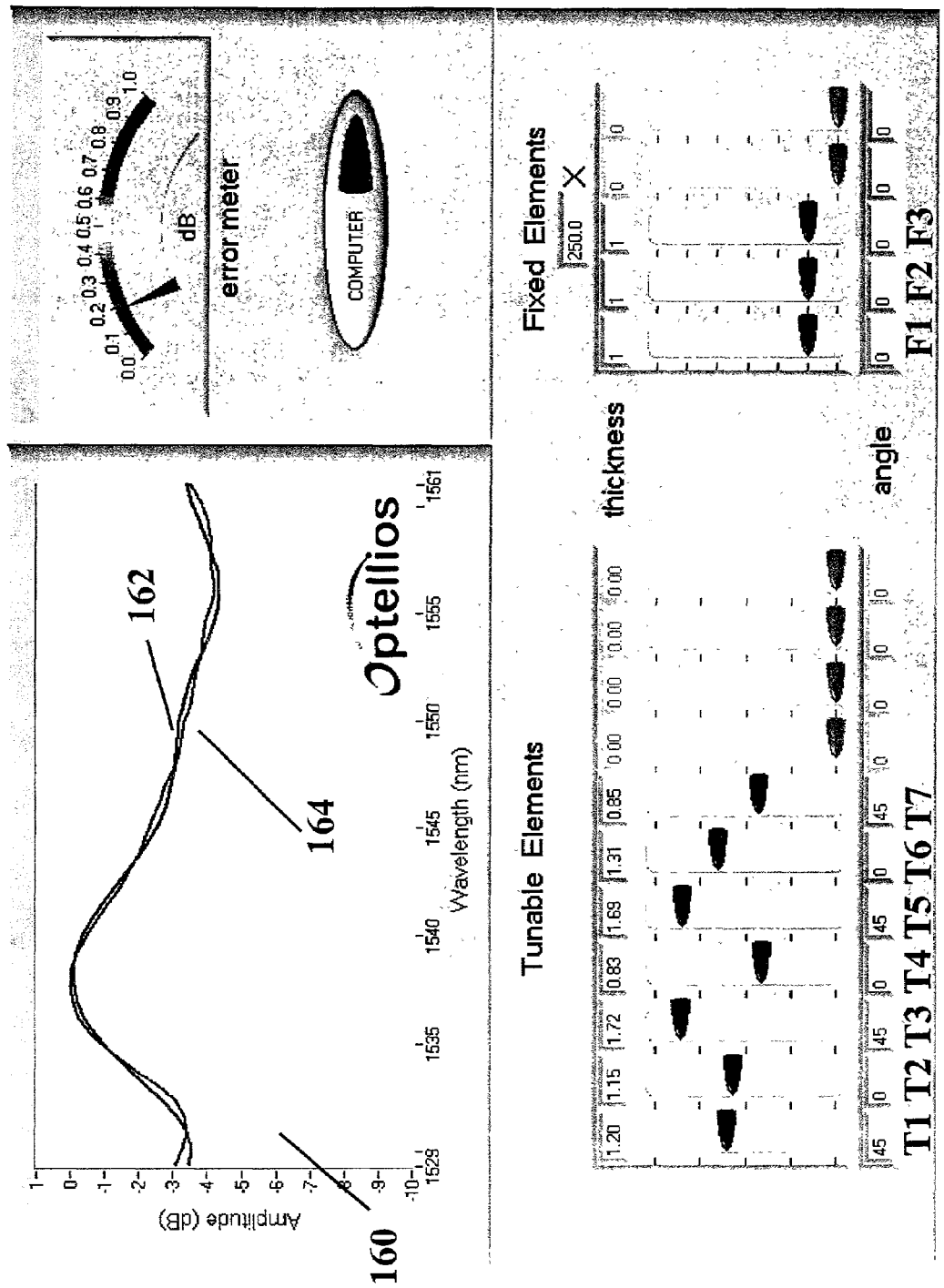
FIG. 21 is a graph of a desired curve and obtainable curve as functions of wavelength for an exemplary configuration of an optical level controller in accordance with the present invention.
Figure 22:
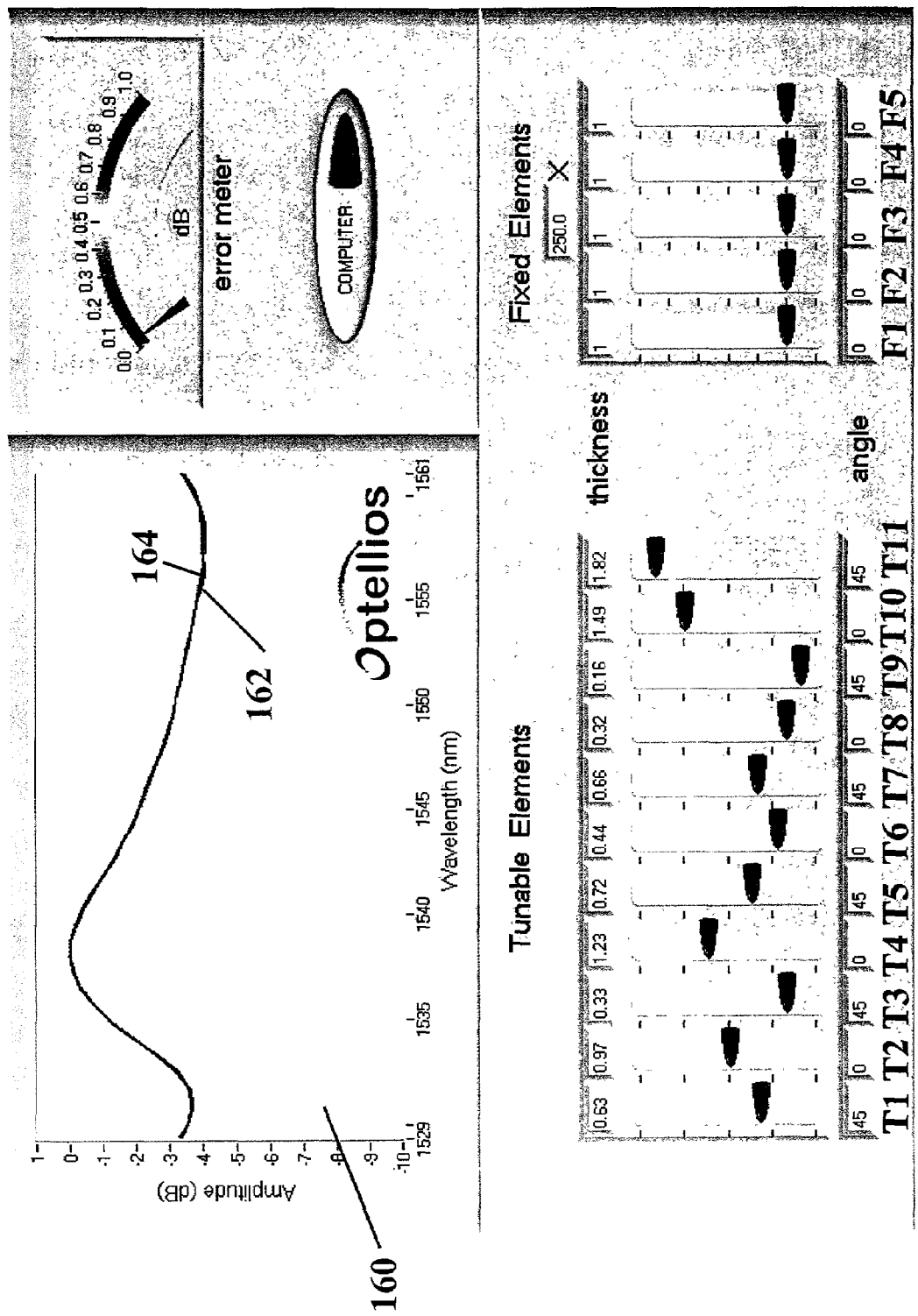
FIG. 22 is a graph of a desired curve and obtainable curve as functions of wavelength for another exemplary configuration of the optical level controller.

FIG. 21 shows a graph of optical signal level as a function of wavelength. Two curves are shown in the plot window 160. Curve 162 represents the desired transfer function and curve 164 represents the transfer function obtained by controlling the parameter values shown at the bottom of FIG. 21. Two groups of control parameters are shown under the respective headings of "Tunable Elements" and "Fixed Elements". The control parameters under the heading "Tunable Elements" represent the values of optical thickness and orientation for the variable elements. The optical thickness (in radians) is depicted at the upper portion of the slide bar in each control parameter group, and the orientation (in degrees) is depicted at the bottom of the slide bar in each control parameter group. The control parameters under the heading "Fixed Elements" are the values of optical thickness and the orientation for the fixed elements. As shown in FIG. 21, the error between the target curve and the obtainable curve is less than 0.5 dB. FIG. 22 shows a graph of an optical signal level as a function of wavelength for another exemplary configuration. As shown in FIG. 22, the error between the desired curve and obtainable curve is less than 0.05 dB. These simulations were prepared under the assumption that the structures of the components are substantially similar to that shown in FIG. 5A and FIG. 5B. In FIG. 21, the component consists of Tunable element (T) and Fixed element (F), and arranged as T1T2F1T3T4F2T5T6F3T7. In FIG. 22, the component is arranged as T1T2F1T3T4F2T5T6F3T7T8F4T9T10F5T11

Thus, as illustrated in FIGS. 21 and 22, a wavelength dependent optical level controller in accordance with the present invention, is easily tunable, and capable of accurately providing a desired power level curve as a function of wavelength.

It may also be useful to make automatic adjustments in power level when a polarization encoder is used as part of an optical power level controller. In order to make an automatic gain adjustment device in which the wavelengths are appropriately attenuated to the desired values, it is necessary to identify the power level at the output of the device so that the appropriate correction can be made by feedback control. Thus the invention may further comprise a device which could be used to measure the output power level as function of wavelength. The feedback control can be adjusted by using at least one attribute of the light signal, such as intensity, polarization, and phase.

While several methods exist in the prior art to make these measurements, such as a spectrometer, a more compact version of the device is more desirable. A non-limiting example of an output power level measuring device is based on a piezoelectric tunable Fabry-Perot interferometer, as shown in FIG. 23. In such a device, the gap of the resonator is rapidly scanned, while monitoring an output of the cavity as a function of time, thereby chirping the detector through a range of sensing wavelengths by varying to the resonant wavelength of the Fabry-Perot device. The resultant time-dependent signal can then be translated to intensity versus wavelength information. This measurement can be taken repetitively. It is also possible to make a MEMS based tunable optical analyzer in which the mirrors are moved using a micro electric machine based system. A MEMS based analyzer comprises mirror coated surfaces which are moved by piezoelectric actuators. The separation between the mirrors determines resonance conditions, while an appropriately placed electrode, which may be a transparent electrode such as indium tin oxide, on the opposite side provides a means of measuring the capacitance, and hence an electrical measurement of the resonance wavelength. The foregoing examples are not exhaustive and other devices for the purpose of measuring output power levels will be apparent.

An application of a wavelength dependent optical level controller includes power level adjustments for applications where unequal power levels of different wavelengths have to be minimized. Using a device that can detect the power level at different wavelengths, such as the one described before, it is possible to determine the target values of the optical attenuation for different wavelengths, by taking into account, if necessary, the unequal gain profile of the optical amplifier.

For such a case, the optical power level controller will benefit from an ability to attenuate different wavelengths by different amounts. In some cases it will not be practical to provide an encoder with a one-to-one correspondence between the number of variable parameters and the number of wavelength bands to be controlled. Therefore a minimization procedure may be used to adjust the desired level of attenuation at all wavelengths simultaneously. The inventors have determined such a procedure which allows the desired wavelength dependent attenuation to be achieved close to the target profile. This procedure has been implemented in software, allowing the evaluation of many different configurations to confirm that the target values can be achieved to within a specified range.

The specified target range may be achieved in a configuration where variable and fixed elements within the polarization encoding stack are singly alternated, and all system parameters are held fixed except for the birefringence of the variable elements. Fixed and variable elements are oriented so that for all elements of one type (fixed or variable) are oriented parallel and the optical axis for all elements of one type makes a 45 degree angle with respect to the optical axis of all elements of the other type.

Better optimization can be achieved in a modified configuration in which some of the variable elements are held in an orientation parallel to that of the fixed elements, while all other variable elements are oriented with the optical axis at a 45 degree angle with respect to the optical axis of fixed elements.

The specified target range may be achieved, using the configuration described above, holding all system parameters fixed except the crystallographic orientation of the variable elements in the encoding stack.

An empirically determined optimum thickness for the fixed elements in the polarization encoding stack has been found to be in accordance with the equation, $y=nx$, where $y$ is the thickness of the $n^{th}$ fixed element; $x$ is the thickness of the first fixed element; and $n$ is an integer. Other configurations can also be used as will be obvious to those skilled in the art.

In other embodiments, the tunable wavelength dependent optical level controller comprises a control algorithm for monitoring individual channel power levels or other attributes of light, such as polarization, phase, and provide feedback for proper automatic attenuation of each channel. In one embodiment the output power level of each of the channels is measured and compared to the target value, and the difference computed and feedback to the appropriate channel of the optical power level controller.

In another embodiment of the tunable wavelength dependent optical level controller, an algorithm that updates all the channels simultaneously is used, which may provide faster response times. Assuming that the power level of different channels are known or determined, it is then possible to compute the attenuation function which would make all channel power levels the same. Allowing the targeted power level to be less than that of the weakest channel may allow greater flexibility in optimization. After setting the target value in the minimization algorithm allows the correct values of birefringence and/or crystallographic orientation to be computed for each of the variable elements of the power level attenuator. The desired optical properties may be related to values of applied voltage for each variable element. Once the appropriate voltages are determined, application of the computed voltages automatically results in power level equalization. This procedure may be periodically updated at the desired rate provided that it is slower than the computation and the update time required for each cycle. An assumption that has been made in this procedure is that the relationship between the birefringence and voltage is known, and that the values of the fixed birefringent elements are also known. In most cases, this is a safe assumption since the relationship between the voltage and the birefringence can be determined if it is not known and the values of the fixed elements can be determined by any suitable calibration procedure.

In an optical transmission system, the polarization encoder may be placed in optical communication with an input optical waveguide and an output optical waveguide. A transmitter, in communication with the input waveguide transmits a signal that travels through the waveguide to the encoder. The encoder processes the signal and passes it to the output waveguide. A receiver receives the processed signal.

In an optical transmission system, the polarization encoder may further comprise an optical system structured to reflect back light passing through the encoder, at least once, such that the device has a reflective mode wherein the input and output can be disposed at least partly on a same side of the apparatus.

In an optical transmission system, the birefringent elements in the polarization encoder may be arranged in such a way that there is no polarization change in the absence of an external perturbation. This is often desired in telecommunications systems to maintain the traffic (data communication) in the event of a power failure. This, for example, can be achieved using homeotropically aligned liquid crystals. In the homeotropically alignment, the liquid crystal molecules are aligned perpendicular to the surface in the absence of an electric field; therefore, the effective birefringence is zero, and hence, no polarization change is imparted to the light signal.

Because numerous modifications and changes to the embodiments described above will readily occur to those of ordinary skill in the art, it is not desired to limit the invention to the exact construction and operation illustrated and described. For example, a polarization encoder in accordance with the present invention may concurrently perform the functions of a wavelength dependent optical switch and the functions of an optical level controller as described herein. A stack of birefringent elements may include birefringent elements that are linearly birefringent, circularly birefringent, or a combination thereof. Polarization may be imparted by a birefringent element, a Faraday rotator, a polarizing interferometer, a polarization diverting element, or a combination thereof. Accordingly, all suitable modifications and equivalents should be considered as falling within the spirit and scope of the invention. It is thus understood that the invention is not limited to the specific embodiments disclosed herein, and that many modifications and other embodiments of the invention are intended to be included within the scope of the appended claims.

What is claimed is:

1. An optical apparatus, comprising:
   at least one optical component arranged along a transmission path of at least one light beam coupled as an input to the apparatus, the light beam containing a plurality of wavelengths defining channels, wherein said optical component is controllable to effect a polarization transformation, and wherein the optical component comprises at least one variable birefringent element that is controllable as to at least one of phase retardation and orientation by at least one perturbation selected from the group consisting of electrical, mechanical, thermal, magnetic, and optical perturbation;

a control operatively coupled to the at least one optical component so as to vary a characteristic of said optical component such that at least one of the channels is imparted a polarization state by said at least one optical component, that is distinct from a state of at least one other of the channels, whereby said at least one of said channels can be discriminated by said distinct polarization state;

wherein said apparatus is selectably controllable to effect said polarization transformations;

at least one polarization control device disposed along the transmission path with the component, wherein the polarization transformation by the component sets a portion of at least one input to said distinct polarization state, and said portion is coupled to at least one output of the apparatus; and, a feedback sensor operable to determine an output level of the apparatus at least at one output defined by at least one attribute of output, and a control responsive to the sensor, the control being coupled to adjust at least one said variable birefringent element to achieve a predetermined intensity attenuation at least at one wavelength at said output.

2. The optical apparatus of claim 1, wherein at least part of said optical component comprises at least one tunable element, and wherein adjustment of said tunable element permits control of at least one of a character of said distinct polarization state and a selection of channels imparted with said distinct polarization state.

3. The optical apparatus of claim 1, wherein the optical component comprises an element that is at least one of linearly and circularly birefringent.

4. The optical apparatus of claim 1, wherein the optical component comprises a plurality of elements for determining said distinct polarization state, at least one of said elements being selected from the group consisting of a birefringent element, a Faraday rotator, a polarizing interferometer and a polarization responsive diverting element.

5. The optical apparatus of claim 1, wherein the optical element comprises a plurality of birefringent elements selected from the group consisting of: liquid crystal elements, polymer elements, oriented polymer elements, Faraday rotator, calcite crystal elements, polarization maintaining fiber, lithium niobate elements and combinations thereof.

6. The optical apparatus of claim 1, wherein the tunable element comprises liquid crystal.

7. The optical apparatus of claim 1, wherein in said distinct polarization state is achieved upon application of said perturbation only.

8. The optical apparatus of claim 1, wherein no said polarization transformation occurs in absence of said perturbation.

9. The optical apparatus of claim 8, wherein the tunable element comprises a homeotropically aligned liquid crystal and the birefringence is electrically controllable.

10. The optical apparatus of claim 1, wherein the optical component comprises at least one variable birefringent element and at least one fixed element along the transmission path, wherein the variable birefringent element is controllable as to at least one of phase retardation and orientation, and the fixed element is fixed as to at least one of phase retardation and orientation.

11. The optical apparatus of claim 10, wherein the fixed elements are identical.

12. The optical apparatus of claim 10, wherein at least one said variable birefringent element and at least said fixed element define an associated set of elements along the transmission path, wherein at least one member of said set has an orientation of substantially 45 degrees relative to at least one other member of the set.

13. The optical apparatus of claim 10, wherein said at least one variable birefringent element and said at least one fixed element define elements disposed along the transmission path, of which at least two said elements are aligned parallel and at least two said elements are aligned substantially at 45 degrees relative to one another.

14. The optical apparatus of claim 1, further comprising at least one additional said optical component, wherein the optical component and the additional optical component form a plurality of polarization encoding devices arranged in one of a series and parallel arrangement along the transmission path.

15. The optical apparatus of claim 1, wherein the polarization control device comprises at least one of a polarizing beam splitter, a polarizing beam displacer, and a polarization sensitive filter, disposed at least at one of an input to said component and the output of the optical apparatus.

16. The optical apparatus of claim 1, wherein the polarization control devices are configured for polarization insensitive operation at any arbitrary polarization of the light beam at the input.

17. The optical apparatus of claim 1, wherein the input polarization control device produces two intermediate beams with orthogonal polarizations and processes both said beams along at least a part of the transmission path.

18. The optical apparatus of claim 1, further comprising a modeling control operable to model the apparatus using a model including at least one of an operation of a simulative device, an algebraic method, a Jones matrix calculation and a Muller matrix calculation for predicting an output attenuation at least at one wavelength, wherein the control is coupled to adjust at least one said variable birefringent element based on a prediction of the modeling control.

19. The optical apparatus of claim 1, further comprising an optical system structured to reflect-back light passing through the optical component, at least once, whereby the device has a reflective mode wherein the input and output can be disposed at least partly on a same side of the apparatus.

20. The optical apparatus of claim 1, further comprising at least one additional said optical component, wherein the optical component and the additional optical component form a plurality of polarization encoding devices arranged in one of a series and parallel arrangement along the transmission path, said plurality of devices being operable for at least one of selecting among channels for routing and switching, and for controllably attenuating one or more of the channels by concurrent operation of said plurality of devices.

21. The optical apparatus of claim 1, further comprising at least one additional said optical component, in an array having a plurality of outputs controllably selected for at least proportionately routing one or more of said channels.

22. The optical apparatus of claim 1, wherein the optical component comprises a plurality of serially disposed portions that differ in at least one of material, thickness, birefringence and optical orientation, for imparting said distinct polarization state.

23. The optical apparatus of claim 22, wherein at least one said optical component comprises a variably birefringent element containing liquid crystal, and is abutted against an adjacent one of said optical components forming a container wall for said liquid crystal.

24. The optical apparatus of claim 1, wherein said optical component comprises portions disposed serially along the transmission path, having a range of different thickness, and controllably selectable values of at least one of birefringence and optical orientation, for imparting said distinct polarization state to one or more of the channels exclusively of at least one or more others of the channels.

25. The optical apparatus of claim 1, further comprising at least one polarization responsive output component disposed at a position along the transmission path following the optical component, said output diversion component operating differently with respect to the wavelength having the distinct polarization state versus at least one other wavelength having a different polarization state, for at least one of diverting, switching, proportioning and attenuating wavelengths passing through the encoder.

26. The optical apparatus of claim 1, further comprising at least one polarization responsive input diversion component operable to separate an arbitrarily polarized input beam into two orthogonal polarization components, and wherein the two orthogonal polarization components are both passed through the encoder and recombined.

27. An optical apparatus, comprising
at least one optical component arranged along a transmission path of at least one light beam coupled as an input to the apparatus, the light beam containing a plurality of wavelengths defining channels, wherein said optical component is controllable to effect a polarization transformation, and wherein the optical component comprises at least one variable birefringent element that is controllable as to at least one of phase retardation and orientation by at least one perturbation selected from the group consisting of electrical, mechanical, thermal, magnetic, and optical perturbation;
a control operatively coupled to the at least one optical component so as to vary a characteristic of said optical component such that at least one of the channels is imparted a polarization state by said at least one optical component, that is distinct from a state of at least one other of the channels, whereby said at least one of said channels can be discriminated by said distinct polarization state;
wherein said apparatus is selectably controllable to effect said polarization transformation;
further comprising at least one polarization control device disposed along the transmission path with the component, wherein the polarization transformation by the component sets a portion of at least one input to said distinct polarization state, and said portion is coupled to at least one output of the apparatus;and,
a modeling control operable to model the apparatus using a model including at least one of an operation of a simulative device, an algebraic method, a Jones matrix calculation and a Muller matrix calculation for predicting an output attenuation at least at one wavelength, wherein the control is coupled to adjust at least one said variable birefringent element based on a prediction of the modeling control.

28. A method for adjusting an attribute of an optical signal at least at one wavelength, said method comprising the steps of:
receiving at least one optical signal having a plurality of channels therein;
selectably and controllably imparting a distinct polarization state to selected ones of said channels;
processing selected ones of said channels in accordance with said imparted distinct polarization, for channel specific steps comprising at least one of switching to and between outputs, routing to selected outputs, attenuation at a selected output, proportioning among two or more outputs, measuring, and level control of at least a component of said selected ones of the channels having said distinct polarization states;
wherein said step of selectably and controllably imparting a respective polarization comprises at least one of adjusting a value of birefringence of at least one variable birefringence element traversed by the optical signal and adjusting an optical orientation of said birefringence element traversed by the optical signal to develop an output; and,
sensing and feeding back at least one attribute of the output to a control, and operating the control to adjust at least one said variable birefringence element to achieve a predetermined intensity attenuation at said output.

29. The method of claim 28, further comprising the steps of:
assessing an output power level of at least one channel, of at least one selected output and at least one selected polarization state, by at least one of measuring and modeling; and
imparting a polarization transformation for at least one of switching and proportionately distributing the channel to at least one output as a function of the output power level.

30. The method of claim 28, comprising adjusting a tunable element to control of at least one of a character of said distinct polarization state and a selection of channels imparted with said distinct polarization state.

31. The method of claim 28, wherein said imparting of said distinct polarization state comprises passing the optical signal through at least one variable birefringent element that is controllable as to at least one of phase retardation and orientation.

32. The method of claim 31, further comprising passing the optical signal through a polarization control device at least at one of an input and an output of the device, comprising at least one of a polarizing beam splitter, a polarizing beam displacer, and a polarization sensitive filter, for at least one of separating channels into orthogonal components at the input to be handled in parallel, and at least proportionately separating components at the output as a function of said distinct polarization state.

33. The method of claim 28, further comprising adjusting at least one of phase retardation and orientation of the variable birefringent element by varying at least one of electrical, mechanical, thermal, magnetic, and optical perturbation.

34. The method of claim 28, comprising imparting said distinct polarization state using an optical element that imparts no polarization transformation absent perturbation.

35. The method of claim 28, comprising passing the optical signal through successive optical elements comprising at least one variable birefringent element and at least one fixed element along a transmission path, and controlling the variable birefringent element as to at least one of phase retardation and orientation.

36. The method of claim 35, comprising at least one of physically and controllably orienting the successive optical elements in associated sets of elements along the transmission path, wherein at least one member of said set has an orientation of substantially 45 degrees relative to at least one other member of the set.

37. The method of claim 28, further comprising a modeling operation using a model including at least one of an operation of a simulative device, an algebraic method, a Jones matrix calculation and a Muller matrix calculation for predicting an output attenuation at least at one wavelength, and adjusting at least one said variable birefringent element to achieve a predetermined intensity attenuation at least at one wavelength of said output.

38. The method of claim 28, further comprising a modeling operation using a model including at least one of an operation of a simulative device, an algebraic method, a Jones matrix calculation and a Muller matrix calculation for predicting an output attenuation at least at one wavelength, and adjusting at least one said variable birefringent element to achieve a predetermined intensity attenuation at least at one wavelength of said output.

39. The method of claim 28, further comprising reflecting light back after imparting said distinct polarization, and operating in a reflective mode wherein input and output can be disposed at least partly on a same side.

40. The method of claim 28 comprising passing the optical signal through a plurality of optical components operable to impart a distinct polarization state, and arranged in one of a series and parallel arrangement along a transmission path, and using the distinct polarization state of selected channels for one of attenuating, proportioning and routing the channels to a plurality of outputs.

41. The method of claim 28, comprising passing the optical signal through at least one output polarization control device responsive to respective polarization states produced in the optical signal, and switchably coupling and decoupling the channels in the output to selected ones of plural outputs as a function of said respective polarization states.

42. The method of claim 28, comprising passing the optical signal through at least one output polarization control device responsive to respective polarization states produced in the optical signal, and controllably attenuating the channels in the output at selected ones of plural outputs as a function of said respective polarization states.

43. The method of claim 28, comprising passing the optical signal through at least one output polarization control device responsive to respective polarization states produced in the optical signal, and controllably proportioning the channels in the output between selected ones of plural outputs as a function of said respective polarization states.

44. The method of claim 28, comprising passing the optical signal through at least one output polarization control device responsive to respective polarization states produced in the optical signal, and controllably routing the channels in the output at selected ones of plural outputs as a function of said respective polarization states.

* * * * *